United States Patent
Shkolnik et al.

(10) Patent No.: US 8,326,024 B2
(45) Date of Patent: Dec. 4, 2012

(54) METHOD OF REDUCING THE FORCE REQUIRED TO SEPARATE A SOLIDIFIED OBJECT FROM A SUBSTRATE

(75) Inventors: Alexandr Shkolnik, Los Angeles, CA (US); Ali El-Siblani, Dearborn, MI (US)

(73) Assignee: Global Filtration Systems, Dearborn, MI (US)

( * ) Notice: Subject to any disclaimer, the term of this patent is extended or adjusted under 35 U.S.C. 154(b) by 904 days.

(21) Appl. No.: 12/423,500

(22) Filed: Apr. 14, 2009

(65) Prior Publication Data
US 2010/0262272 A1    Oct. 14, 2010

(51) Int. Cl.
*G06K 9/00* (2006.01)

(52) U.S. Cl. ....... 382/154; 264/401; 264/40.1; 264/140; 264/494

(58) Field of Classification Search .................. 264/401, 264/40.1, 140, 494; 700/119, 120; 382/154
See application file for complete search history.

(56) References Cited

U.S. PATENT DOCUMENTS

| | | | |
|---|---|---|---|
| 5,182,055 A | 1/1993 | Allison et al. | |
| 2001/0048184 A1 | 12/2001 | Ueno | |
| 2005/0058837 A1 | 3/2005 | Farnworth et al. | |
| 2006/0111461 A1* | 5/2006 | Barachevsky et al. | ............ 522/7 |
| 2007/0260349 A1 | 11/2007 | John et al. | |
| 2008/0169586 A1 | 7/2008 | Hull et al. | |
| 2008/0169589 A1 | 7/2008 | Sperry et al. | |
| 2011/0001272 A1* | 1/2011 | Honda et al. | .................. 264/401 |

FOREIGN PATENT DOCUMENTS

| | | |
|---|---|---|
| EP | 1 179 411 A2 | 2/2002 |
| EP | 2 011 631 A1 | 1/2009 |
| EP | 2 067 608 A1 | 6/2009 |
| JP | 2004 122501 A | 4/2004 |

OTHER PUBLICATIONS

PCT International Search Report for PCT/US2010/030976 dated Jul. 4, 2011.
European Search Report for EP09011099 dated Nov. 27, 2009.

* cited by examiner

*Primary Examiner* — Matthew Bella
*Assistant Examiner* — Ruiping Li
(74) *Attorney, Agent, or Firm* — Hansen IP Law PLLC

(57) ABSTRACT

A method and apparatus for making a three-dimensional object from a solidifiable material such as a photopolymer is shown and described. In accordance with the method, positions relative to a build axis are subdivided into first and second exposure data subsets, and the first and second exposure data subsets are solidified in alternating sequences to reduce the surface area of solidified material in contact with a solidification substrate.

30 Claims, 22 Drawing Sheets

METHOD OF REDUCING THE FORCE REQUIRED TO SEPARATE A SOLIDIFIED OBJECT FROM A SUBSTRATE

FIELD

The disclosure relates to a system and method for manufacturing three-dimensional objects, and more specifically, to a method of reducing the force required to separate a solidified object from a substrate against which the object is removably adhered.

DESCRIPTION OF THE RELATED ART

Three-dimensional rapid prototyping and manufacturing allows for quick and accurate production of components at high accuracy. Machining steps may be reduced or eliminated using such techniques and certain components may be functionally equivalent to their regular production counterparts depending on the materials used for production.

The components produced may range in size from small to large parts. The manufacture of parts may be based on various technologies including photo-polymer hardening using light or laser curing methods. Secondary curing may take place with exposure to, for example, ultraviolet (UV) light. A process to convert a computer aided design (CAD) data to a data model suitable for rapid manufacturing may be used to produce data suitable for constructing the component. Then, a pattern generator may be used to construct the part. An example of a pattern generator may include the use of DLP (Digital Light Processing technology) from Texas Instruments®, SXRD™ (Silicon X-tal Reflective Display), LCD (Liquid Crystal Display), LCOS (Liquid Crystal on Silicon), DMD (digital mirror device), J-ILA from JVC, SLM (Spatial light modulator) or any type of selective light modulation system.

In certain three-dimensional object manufacturing processes, it is important to ensure that the solidifiable material (e.g., polymeric resin) used to make the object forms a smooth and substantially planar surface to which solidification energy from a pattern generator will be applied. One technique requires the use of a "smoothing blade" or "doctor blade" to remove irregularities in the surface profile of a solidifiable polymeric resin. However, this technique requires additional moving parts and introduces undesirable complexity into the system. Another technique provides a transparent or translucent rigid layer of material which sits on top of the exposed surface of the solidification material. However, this technique can cause the solidifiable material to solidify in contact with the reference plane, in which case the solidified material must be removed from the reference plane. In certain cases, the separation force required to separate the solidified material from the reference plane is so great that it causes the object to deform or break. In certain systems, a flexible film or belt is used to transport solidifiable material to the pattern generator, and the film or belt acts as a flexible solidification substrate. In such systems, there is a propensity for the film or belt to break or deform when the object is separated from it. Thus, a need has arisen for a system and method of making three-dimensional objects which addresses the foregoing issues.

BRIEF DESCRIPTION OF THE DRAWINGS

The disclosure will now be described, by way of example, with reference to the accompanying drawings, in which.

DETAILED DESCRIPTION

Figure 1A:
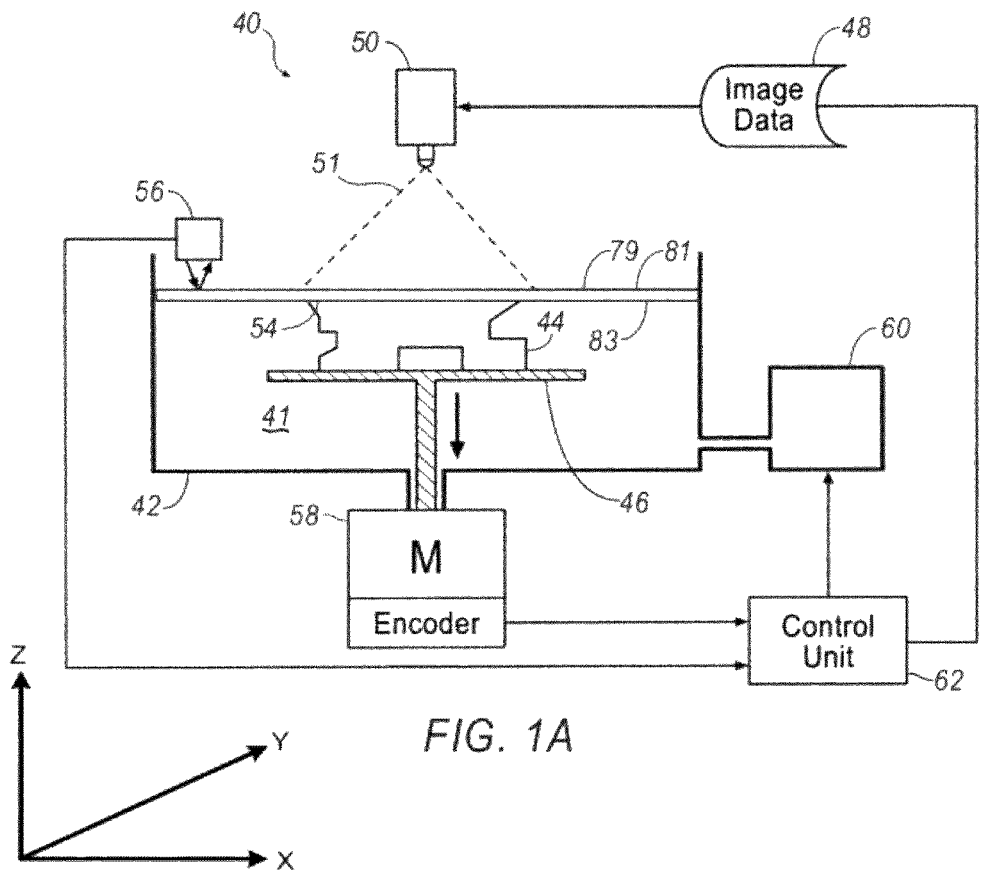
FIG. 1A is a cross-sectional view of system for making a three-dimensional object from a solidifiable material which includes a solidification substrate.

The Figures illustrate examples of a system and method for manufacturing. Based on the foregoing, it is to be generally understood that the nomenclature used herein is simply for convenience and the terms used to describe the invention should be given the broadest meaning by one of ordinary skill in the art.

The system and methods described herein are generally applicable to additive manufacturing of three-dimensional objects, such as components or parts (discussed herein generally as objects), but may be used beyond that scope for alternative applications. The system and methods generally include a pattern generator that applies energy to solidify a solidifiable material in accordance with image data that corresponds to a three-dimensional object. In accordance with the method, different positions relative to an object build axis are solidified in multiple steps, during which the build platform on which the object is built is at different positions relative to the exposed surface of the solidifiable material.

As discussed herein, a solidifiable material is a material that when subjected to energy, wholly or partially hardens. This reaction to solidification or partial solidification may be used as the basis for constructing the three-dimensional object. Examples of a solidifiable material may include a polymerizable or cross-linkable material, a photopolymer, a photo powder, a photo paste, or a photosensitive composite that contains any kind of ceramic based powder such as aluminum oxide or zirconium oxide or ytteria stabilized zirconium oxide, a curable silicone composition, silica based nano-particles or nano-composites. The solidifiable material may further include fillers. Moreover, the solidifiable material my take on a final form (e.g., after exposure to the electromagnetic radiation) that may vary from semi-solids, solids, waxes, and crystalline solids.

When discussing a photopolymerizable, photocurable, or solidifiable material, any material is meant, possibly comprising a resin and optionally further components, which is solidifiable by means of supply of stimulating energy such as electromagnetic radiation. Suitably, a material that is polymerizable and/or cross-linkable (i.e., curable) by electromagnetic radiation (common wavelengths in use today include UV radiation and/or visible light) can be used as such material. In an example, a material comprising a resin formed from at least one ethylenically unsaturated compound (including but nor limited to (meth)acrylate monomers and polymers) and/or at least one epoxy group-containing compound may be used. Suitable other components of the solidifiable material include, for example, inorganic and/or organic fillers, coloring substances, viscose-controlling agents, etc., but are not limited thereto.

When photopolymers are used as the solidifiable material, a photoinitiator is typically provided. The photoinitiator absorbs light and generates free radicals which start the polymerization and/or crosslinking process. Suitable types of photoinitiators include metallocenes, 1,2 di-ketones, acylphosphine oxides, benzyldimethyl-ketals, α-amino ketones, and α-hydroxy ketones. Examples of suitable metallocenes include Bis(eta 5-2,4-cyclopenadien-1-yl) Bis[2,6-difluoro-3-(1H-pyrrol-1-yl)phenyl] titanium, such as Irgacure 784, which is supplied by Ciba Specialty chemicals. Examples of suitable 1,2 di-ketones include quinones such as camphorquinone. Examples of suitable acylphosphine oxides include bis acyl phospine oxide (BAPO), which is supplied under the name Irgacure 819, and mono acyl phosphine oxide (MAPO) which is supplied under the name Darocur® TPO. Both Irgacure 819 and Darocur® TPO are supplied by Ciba Specialty Chemicals. Examples of suitable benzyldimethyl ketals include alpha, alpha-dimethoxy-alpha-phenylacetophenone, which is supplied under the name Irgacure 651. Suitable α-amino ketones include 2-benzyl-2-(dimethylamino)-1-[4-(4-morpholinyl)phenyl]-1-butanone, which is supplied under the name Irgacure 369. Suitable α-hydroxy ketones include 1-hydroxy-cyclohexyl-phenyl-ketone, which is supplied under the name Irgacure 184 and a 50-50 (by weight) mixture of 1-hydroxy-cyclohexyl-phenyl-ketone and benzophenone, which is supplied under the name Irgacure 500.

The pattern generator(s) may be configured in a number of ways. Many may provide controlled electromagnetic radiation to provide a desired pattern. The electromagnetic radiation may include actinic light, visible or invisible light, UV-radiation, IR-radiation, electron beam radiation, X-ray radiation, laser radiation, or the like. Moreover, while each type of electromagnetic radiation in the electromagnetic spectrum may be discussed generally, the disclosure is not limited to the specific examples provided. Those of skill in the art are aware that variations on the type of electromagnetic radiation and the methods of generating the electromagnetic radiation may be determined based on the needs of the application.

Figure 1B:
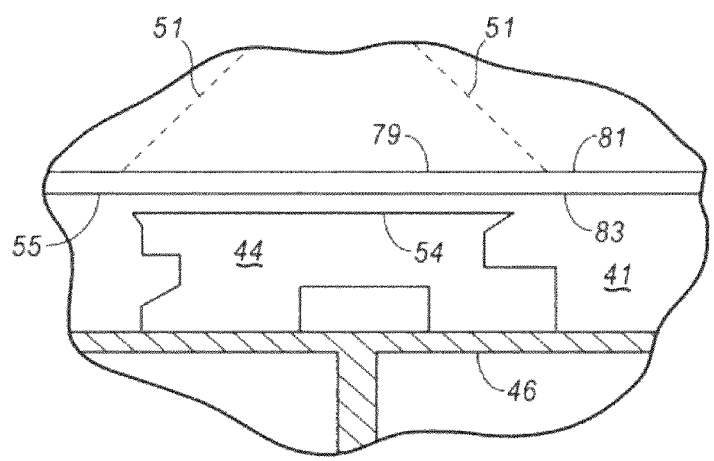
FIG. 1B is a cross-sectional detailed view of a portion of FIG. 1A.

Referring to FIGS. 1A and 1B, a first illustrative example of a system 40 for making a three-dimensional object from a solidifiable material 41 is described. System 40 is generally configured to receive data describing the shape and appearance of the object (such as CAD data) and to create a solid object 44 in conformity with the data. System 40 includes a solidifiable material 41, which in the example of FIG. 1A is a photopolymeric resin capable of being selectively hardened by the application of electromagnetic radiation. Container 42 is a generally rigid vessel with an empty interior that holds solidifiable material 41. Build platform 46 is a generally rigid platform on which object 44 is progressively built from a first end proximate build platform 46 to an opposite end distal from build platform 46. Build platform 46 is generally movable in a vertical direction as indicated by the downward pointing arrow. Motor "M" actuates the movement of build platform 46. FIG. 1A depicts a first position of build platform 46 in which pattern generator 50 has just solidified solidifiable material 41, and FIG. 1B depicts a second position of build platform 46 in which build platform 46 has moved away from build platform 46, thereby separating the upper, most recently solidified surface 54 of object 44 from solidification substrate 79 and allowing fresh solidifiable material to flow between surface 54 and solidification substrate 79, as discussed further below.

Object 44 is shown here as an example of a design that is made by system 40. The size, shape, or any other feature of object 44 is a function of energy pattern 51 and the motion of object build platform 46. For example, the arbitrary shape shown is produced through movement of build platform 46 downward while pattern generator 50 selectively hardens solidifiable material 41. However, such a shape could also be constructed as a series of layers by moving object build platform 46 a certain distance downward and then exposing solidifiable material 41 to energy supplied by pattern generator 50 for a predetermined time, and then repeating the process until the object is built.

Pattern generator 50 is positioned to supply solidification energy 51 such as electromagnetic radiation to solidifiable material 41 to selectively solidify material 41 in accordance with a generated energy pattern 51. In an example wherein pattern generator 50 is a digital light projector, the generated energy pattern 51 comprises pixels or volumetric pixels ("voxels"). Each voxel corresponds to a position in the x, y plane of an exposed surface 55 (FIG. 1B) of solidifiable material 41 as well as to a solidification depth, z, which is a distance below exposed surface 55 in which solidification occurs. At any given location on exposed surface 55, the voxel depth will depend, at least in part, on the localized intensity of the energy supplied by pattern generator 50 (e.g., light intensity) as well as the time period for which the energy is supplied. In an example wherein pattern generator 50 is a moving light source (e.g., a movable laser), the generated energy pattern corresponds to the path of travel of the light source. Again, the depth of curing at any particular location will depend, at least in part, on the exposure time and intensity of the energy supplied.

Control unit 62 supplies image data 48 to pattern generator 50 to drive the pattern generation process. Image data 48 may include voxel data that includes an intensity for each pixel in the x, y plane, slice-data files, or bitmaps derived from slice-data files. Typical file types used to generate bitmaps include STL (Stereo Lithography) files or other CAD (Computer Aided Drafting) files commonly translated for rapid prototyping systems into formats such as SLC, CLI slice data files or voxelized data files which may include data formats such as BMP, PNG, etc. Image data 48 may be converted to exposure data which is then used by pattern generator 50 to drive the exposure process. Image data 48 corresponds to energy pattern 51 and may be generated by control unit 62, by pattern generator 50, or by an external source or device (e.g., a network or storage device). Image data 48 may also be modified to a format suitable for pattern generator 50 (e.g., modification of a compressed file such as a TIFF file using CCIT type 4 compression into a standard bitmap). In general, image data 48 may be define bi-tonal bitmap images, "grayscale" (e.g., pixel data with variable energy intensities and/or exposure times associated with each pixel), color, or color with intensity and/or exposure time information. Other pattern formats may be available for use such as JPEG, DXF, BMP, PNG, SVG, etc., or other vector or pixel-defined image files (which may be based on industry standards or custom file types).

In certain examples, image data 48 comprises voxel data. Voxel data may be considered a collection or set of data that represents volumetric pixels. The voxel data may be organized into a voxelized bitmap pattern that includes a grayscale value for each pixel and/or an exposure time. The voxelized bitmap may be considered an organized collection of individual voxels. Although the voxels may be organized into a bitmap, each voxel is generally treated individually and has its own solidification (e.g., curing) depth (which can be determined by the exposure time and/or intensity value assigned to each voxel) to determine each voxel's geometry independent of any other voxel data. The object 44 may be formed using the voxel data where each voxel may be created in the solidifiable material 41 by exposing the exposed surface 54 of solidifiable material 41 to obtain a particular depth of cure (typically determined by the grayscale value and/or exposure time) and thereby create the three-dimensional voxel in the solidifiable material 41. Each voxel may be generated individually, in a group or subset (e.g., more than one voxel), or as a whole of the voxel data (e.g., all voxels at once).

Two-dimensional bitmap data may also be used as image data 48. The bitmap information may be a typical (x,y) location for a pixel (whether inherent to the file format or having specified locations). The grayscale value represents a total solidification energy exposure for the pixel, where total exposure is expressed as a function of the intensity at the specified x, y location of the pixel (i.e., I(x,y)) and the exposure time, t, as follows:

$$\text{Total Exposure}(x,y) = \int I(x,y) dt \quad (1)$$

where the integration is performed over the exposure time period, Δt. In certain examples, the grayscale output value may be used to control the pattern generator's output to provide full intensity, no output, or variations in between. In processes using a fixed exposure time per pixel, the pattern generator may reduce the amount of electromagnetic radiation (e.g., intensity) that the solidifiable material 41 is exposed to for each pixel for the specified exposure time.

In certain pattern generator systems, such as DLP® systems, an array of mirrors is provided, and each mirror corresponds to a position relative to the build axis (e.g., a position in the x,y plane where the build axis is in the z-direction). Each mirror is independently manipulable to control the total exposure received by the pixel location (x,y) on solidifiable material exposed surface 55 to which the mirror corresponds. Where a DLP® type pattern generator is used, the DLP® micro-mirror for a particular pixel or group of pixels may be positioned to direct the electromagnetic radiation away from the solidifiable material 41. Thus, the electromagnetic radiation is reflected away, but not necessarily completely, from the solidifiable material 41 using the micro-mirror to reduce or eliminate exposure after the elapsed time. Alternatively, the pattern generator 50 may "turn off" the light entirely for that pixel after the exposure time has elapsed. When using a voxelized construction process, each voxel may have its own uniquely assigned thickness (e.g., depth of cure) which is controlled by the grayscale value.

In an example where a grayscale value is assigned to a pixel and a DLP® type pattern generator 50 is used, the DLP® micro-mirror may be moved so as to expose the pixel at the build surface in an alternating manner to provide an overall grayscale value. Where a 50% grayscale is desired, the micro-mirror may be moved so that the solidifiable material 41 is exposed for 50% of the time, and the other 50% of the time the micro-mirror may be moved so as to reflect light away from the solidifiable material 41. In certain DLP® systems, the mirror for each voxel that is to be solidified is activated for the same period of time (exposure time). However, the total incident energy applied to the solidifiable material (i.e., $\int I(x,y)dt$) will vary from location to location due to the variation in the percentage of the total exposure time during which the corresponding mirror directs electromagnetic radiation to the location.

Control unit 62 may be constructed as part of an integral three-dimensional object forming machine, portions of a machine without direct connection to the machine, or distributed elsewhere and connected via a communication medium, such as a network. Control unit 62 may be, for example, a computing device (that may be an embedded resource, external, or a distributed resource) and may be configured as a computer, a programmable logic device, a specialized processor, etc. Control unit 62 also receives a signal indicative of the level of exposed surface 55 (FIG. 1B) in container 42. Based on the signal, control unit 62 adjusts the flow rate of solidifiable material 41 from reservoir 60.

As discussed below, the systems and methods described herein may be used with "downward", "upward" and "side" projecting systems in continuous or non-continuous exposure modes (e.g., pattern generating modes), any of which may include additional optical elements such as a mirrors or lenses. The systems and methods may be used in a layer, slice, or voxelized data production process, among others, where the pattern generating system provides the electromagnetic radiation to react with (e.g., solidify or partially solidify) a solidifiable material 41 or other material to create the three-dimensional object. Moreover, the systems and methods described herein may also apply to layered construction processes using "upward" or "downward" build directions that may use lithography (generally), FTI (Film Transfer Imaging), three-dimensional Printing technologies, SLS (Selective Laser Sintering) or SLA (Stereolithography Apparatus). Examples of pattern generators may include Digital Light Processing technology (DLP) from Texas Instruments® or SXRD™ or LCD or LCOS or J-ILA from JVC, or LVT (Light Valve Technology), DMD (digital mirror device), or GLV (Grating Light Valve) technology, SLM (Spatial light modulator), or any type of selective electromagnetic radiation or light modulation system, in addition to a scanned and/or vector pattern generators (e.g., using a laser).

The matching of technologies between the pattern generator 50 and solidifiable material 41 may be determined based on the compatibility of the respective technologies used (e.g., a reactive UV photopolymer material and a UV pattern generator). Typical solidifiable materials include photo-reactive (or photo curable) resins that may be in liquid, paste, powder, or other form. Moreover, the systems and methods described herein are not tied to a particular pattern generator or imager technologies.

In the case of voxel-based systems, the electromagnetic radiation supplied by pattern generator 50 may have an adjustable intensity range. In one example of a voxel-based system, electromagnetic radiation from pattern generator 50 is scaled from zero (the minimum) to 255 (maximum). Pattern generator 50 may receive bitmaps having intensity and/or exposure time values for each individual pixel. However, bitmaps with intensity values need not be used since each voxel may be addressed individually and sent to the pattern generator 50 individually without being combined into a bitmap. The bitmaps include "bits" or regions that collectively determine the energy pattern 51. These "bits" or regions (e.g., that make up the voxelized bitmap) are typically defined as rectangular or square regions, but when each "bit" is treated as a voxel, the depth of solidification (which determined the depth of the voxel) may be determined for each voxel independently of the other.

Each bit in a bitmap may also have an intensity value associated with it. Thus, a voxelized bitmap may cover a wide range of solidification depths through the use of an independent grayscale value associated with each bit. Although the intensity may be used to determine the strength of the electromagnetic radiation (e.g., brightness or intensity when discussing visible or UV light, for example), the intensity may also be used to determine the length of time (e.g., exposure time) that the electromagnetic radiation is turned "on" for the pixel. In addition, methods using both a variable intensity and variable exposure time for each pixel may be used.

While the intensity may be expressed as an integer number on a reference scale (e.g., 0 . . . 255), the intensity value may also be compensated or adjusted before being sent to the pattern generator, or may be compensated or adjusted at the pattern generator, or both. For example, where solidifiable material 41 has a minimum intensity threshold that is required to solidify the solidifiable material 41, the "off" or zero (0) value intensity (e.g., brightness and/or "on" time) may be set below that threshold without being set at a value that provides no electromagnetic radiation. Thus, a zero value for intensity on a relative scale such as the 0-255 scale does not necessarily imply that the energy supplied by pattern generator 50 is actually zero. In a typical case, a low level of brightness may correspond to a zero (0) intensity.

Intensity ranges of 0 to 255 are convenient for examples when an 8-bit system is used to determine intensity. However, systems having more or less resolution for intensity may be used. Examples may include a 4 bit system or a 16 bit system. Further, the exposure time of the electromagnetic radiation may have a wide range, for example, 1 millisecond to 100 seconds. Note that the time range is merely an example and is not limiting as the "on time" for the electromagnetic radiation may be dependent on other variables such as the minimum switching time of the pattern generator, the intensity of the electromagnetic radiation, the solidifiable material's minimum effective time and radiation intensity for solidification, the speed of movement of build platform 44, and other factors.

Both intensity and exposure time, or either of them, may be parameters for the bitmap. For example, when a pattern generator 50 has a fixed intensity (such as a laser), the time the source is "on" may be modulated to produce a total exposure value. Alternatively, where the time of exposure is a predetermined value, the intensity of the voxels generated by pattern generator 50 may be modified produce the desired total exposure value.

As discussed previously, the term "total exposure" for a given voxel may be considered the integral of the electromagnetic radiation intensity with respect to time ($E(x,y)=\int I(x,y)dt$) over the exposure period. When performing voxelized construction, the total exposure determines the depth of solidification for each voxel separately and independently of any other voxel. In an example, where the intensity is held constant at 250 (on a 0-255 scale) and the exposure time is 1 second, the exposure will be 250 times 1 second to effectuate a desired depth of solidification for a specific voxel. The time and intensity required to achieve a particular depth of solidification is material dependent. Thus, the time and intensity determined to provide a particular curing depth for a first solidifiable material 41 may not be usable for a second solidifiable material 41. Thus, the depth of solidification can be a function of at least the exposure time, the intensity of the electromagnetic radiation, and the properties of the solidifiable material 41. The combination of intensity and exposure time can be expressed independently (e.g., in data file or data structure) or they may be combined and expressed for each voxel as a grayscale value (such as a value in the 0-255 range) where the exposure time is predetermined. Solidifiable material 41 may behave differently based on the intensity of electromagnetic radiation and/or the time. For example, a low level intensity may not reach a minimum threshold required for the solidifiable material 41 to become wholly or partially solidified. In this case, no amount of exposure time will be sufficient to harden the solidifiable material 41 because the necessary polymerization and/or cross-linking reactions will not be initiated. Alternatively, a higher intensity may cause solidifiable material 41 to become solidified or partially solidified non-linearly faster.

As indicated in FIG. 1A, solidification substrate 79 is a substantially planar substrate that rests on the exposed surface 55 (FIG. 1B) of solidifiable material 41. Solidification substrate 79 is generally rigid or semi-rigid and substantially permeable to the energy supplied by pattern generator 50. As will be discussed below, however, flexible films may also serve as solidification substrates, such as in film transfer imaging systems. In certain examples, it is preferred that the energy from pattern generator 50 can pass through solidification substrate upper surface 81 and lower surface 83 without a significant diminution in transmitted energy or a significant alteration of the energy spectrum transmitted to solidification material 41 relative to the spectrum that is incident to solidification substrate surface 81. In the case where energy pattern 51 is a light pattern, solidification substrate 79 is preferably substantially translucent to the wavelengths of light supplied by pattern generator 50. As energy is supplied to exposed solidifiable material surface 55, solidifiable material 41 will begin to solidify in accordance with the energy pattern 51 supplied by pattern generator 50. Build platform 46 is positioned in the projection area (i.e., the area in the x,y plane that is positioned to receive energy from pattern generator 50) and moves away from solidification substrate 79 during an object building operation, causing fresh solidification material 41 to be supplied to the space between previously solidified portions of object 44 and solidification substrate 79 (FIG. 1B). Once the upper surface 54 of the previously solidified portion of the object reaches a certain distance from solidification substrate 79, pattern generator 50 again applies an energy pattern 51 to upper surface 55 (FIG. 1B) of the solidifiable material 41. The process repeats itself until the object 44 is built. In certain illustrative examples, build platform 46 stops at periodic intervals, and pattern generator 50 supplies energy pattern 51 to the exposed solidification material 41 at exposed solidifiable material surface 55. In other examples, build platform 46 moves continuously away from solidification substrate 79 during an object building operation. In either case, the position of the build platform along the axis of its movement (i.e., the "build axis") corresponds to a position along the object in a direction parallel to the build axis, which may be referred to as a "build axis dimension."

As an object building operation proceeds, solidified material may adhere to bottom surface 83 of solidification substrate 79. If the forces of adhesion between solidification substrate 79 and object 44 are too strong, the movement of build platform 46 away from solidification substrate 79 can cause object 44 to break or distort. To reduce the likelihood of such breakage or distortion, it is preferred that object 44 have greater adhesion to build platform 46 than to solidification substrate 79. It is also preferred that recently solidified material at the upper surface 54 of the object 44 adhere more strongly to the previously solidified material adjacent it than to solidification substrate 79. As explained in detail below, the methods described herein reduce the adhered surface area of solidified material in contact with solidification substrate 79, thereby decreasing the required separation force.

Figure 3:
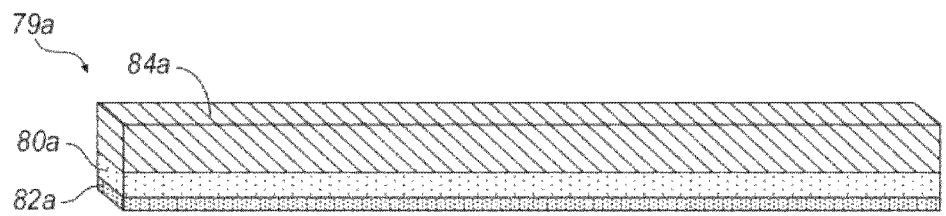
FIG. 3 is a detailed perspective view of an embodiment of a solidification substrate.

In general, a "solidification substrate" is an object with a surface to which the object removably adheres as it is being built. Solidification substrate 79 may have a number of functions, including smoothing the exposed surface 55 of solidifiable material 41 and transporting solidifiable material 41 to the pattern generator 50. One exemplary illustration of a solidification substrate 79a is depicted in FIG. 3. Solidification substrate 79a comprises a first translucent layer 84a that is rigid or semi-rigid. One example of a rigid or semi-rigid layer 84a is a translucent float glass. Another example is a translucent plastic. A variety of different float glasses and plastics may be used. Exemplary plastics that may be used include transparent acrylic plastics supplied by Evonik under the name Acrylite®. However, they are preferably rigid enough to provide a substantially planar exposed surface 55 of solidification material 41 when energy pattern 51 is projected onto surface 55. The term "translucent" is meant to indicate that first layer 84a is capable of transmitting the light wavelengths necessary to solidify solidifiable material 41. In the case of photopolymers, a photoinitiator is commonly provided to start the polymerization/cross-linking process. Photoinitiators will have an absorption spectrum based on their concentration in the photopolymer. That spectrum corresponds to the wavelengths that must pass through solidification substrate 79 (and, therefore, first layer 84a) and which must be absorbed by the photoinitiator to initiate solidification.

In certain examples, solidification substrate 79 is provided with a localized area of resiliency proximate the exposed surface 55 of solidification material 41. Referring to FIG. 3, a translucent resilient layer 80a is provided. The term "translucent" is again used in the sense described above with respect to rigid or semi-rigid layer 84a. A variety of different translucent resilient materials may be used. When provided as a 10 mm layer, the resilient layer 80a transmits at least about 60 percent of received light in the 400-700 nm range. The resilient layer 80a has a 10 mm layer transmission percentages of at least about 70 percent, more preferably at least about 80 percent, and even more preferably at least about 88 percent for light in the 400-700 nm range. The resilient layer 80a also has a percent elongation at break (according to ISO 37) that is at least about 80 percent, more preferably at least about 90 percent, even more preferably at least about 95 percent, and still more preferably at least about 100 percent. In addition, resilient layer 80a preferably has a tensile strength (according to DIN ISO 37) that is at least about 3.0 N/mm$^2$, more preferably at least about 5.0 N/mm$^2$, even more preferably at least about 6.0 N/mm$^2$, and still more preferably at least about 7.0 N/mm$^2$.

Resilient layer 80a may be formed from one or more elastomeric polymers. In one example, silicone elastomers are provided. One particular example of a suitable silicone elastomer is Elastosil® RT 601, which is supplied by Wacker Silicones. Elastosil® RT 601 is a transparent, addition-curing silicone rubber having greater than 88 percent transmission of light in the 400-700 nm range (for a 10 mm layer). The material has an elongation at break of about 100 percent (ISO 37), a tensile strength of about 7.0 N/mm$^2$ (DIN ISO 37), and a tear strength (ASTM D 624B) of about 3.0 N/mm$^2$. In one example, the resilient layer 80a is applied to first translucent rigid or semi-rigid layer 84a by placing the translucent rigid or semi-rigid layer 84a in a mold, providing a solidifiable material comprising resilient layer 80a, and pouring the solidifiable material over the translucent rigid or semi-rigid layer 84a. A surfactant may be selectively applied to regions of the translucent rigid or semi-rigid layer 84a to increase the adhesion of the resilient layer 80a thereto. The mold is then placed in an oven to solidify (e.g., by curing) the solidifiable material comprising resilient layer 80a. The mold is then cooled and the combination of layers 80a and 84a is removed.

Certain solidifiable materials may include components that chemically degrade translucent resilient layer 80a. For example, when certain photoinitiators are used to cure polymeric resins, the solidification process may be damage layer 80a. Accordingly, in certain examples, a translucent protective film 82a is provided. Translucent protective film 82a is preferably a homopolymer or copolymer formed from ethylenically unsaturated, halogenated monomers. Fluoropolymers are preferred. Examples of suitable materials for protective film 82a include polyvinylidene fluoride (PVDF), ethylenechlorotrifluoroethylene (ECTFE), ethylenetetrafluoroethylene (ETFE), polytetrafluoroethylene (PTFE), perfluoroalkoxy (PFA), and modified fluoroalkoxy (a copolymer of tetrafluoroethylene and perfluoromethylvinylether, also known as MFA). Examples of suitable protective film 82a materials include PVDF films sold under the Kynar® name by Arkema, ECTFE films sold under the Halar® name by SolvaySolexis, ETFE films sold under the Tefzel® name by DuPont, PFA films sold under the Teflon®-PFA name by DuPont, and MFA films supplied by Nowofol. An additional example is a fluoropolymer coated polyester release liner film supplied by 3M under the name Scotchpak 9744.

In one example, an ethoxylated (3) trimethylolpropane triacylate ("TMPEOTA") monomer supplied by Sartomer under the name SR454 is provided with an acylphosphine oxide initiator, such as Irgacure 819. Without wishing to be bound by any theory, it is believed that the photopolymerization/photocrosslinking reaction that occurs generates an amount of heat that can damage elastomeric translucent layer 80a. Accordingly, an MFA protective film layer 82a is provided to reduce the effect of the generated heat on layer 80a. In another example, a trimethylolpropane triacylate ("TMPTA") monomer supplied by Sartomer under the name SR351 is used with a Darocur TPO initiator. Again, it is believed that the photopolymerization/photocrosslinking reaction generates an amount of heat that may damage elastomeric translucent layer 80a. Accordingly, an MFA protective film layer 82a is provided.

Figure 4:
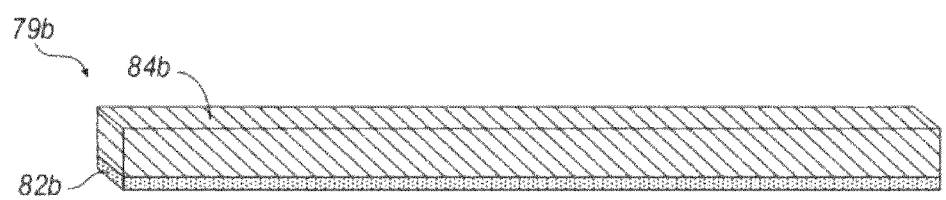
FIG. 4 is a detailed perspective view of an alternative embodiment of a solidification substrate.

In certain cases, the force required to separate a solidified section of object 44 from solidification substrate 79 will be low enough that the resiliency provided by translucent resilient layer 80a will not be required. However, protective film 82 may still be used to protect the rigid or semi-rigid translucent layer 80. Referring to FIG. 4, a solidification substrate 79b is provided which comprises rigid or semi-rigid translucent layer 84b and translucent protective film 82b. Exemplary objects which may not require resilient layer 80, include small parts (e.g., 1 in.×1 in.) such as coping, crowns, or jewelry rings made from wax filled photopolymers.

Figure 5:
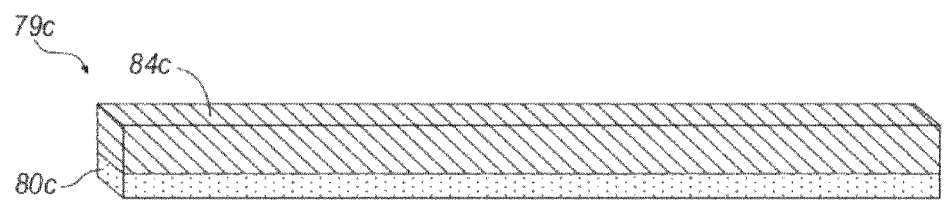
FIG. 5 is a detailed perspective view of another alternative embodiment of a solidification substrate.

In certain other cases, the photopolymerization/photocrosslinking reaction proceeds without damaging the resilient translucent layer 80 or translucent rigid or semi-rigid layer 84 through the generation of excess heat or otherwise. In such cases, protective film 82 is not required. Referring to FIG. 5, a solidification substrate 79c is provided which comprises a rigid or semi-rigid translucent layer 84 and a resilient translucent layer 80c. In one example, Sartomer 351 is used with an Irgacure 784 initiator and protective film 82 is not required.

Figure 2A:
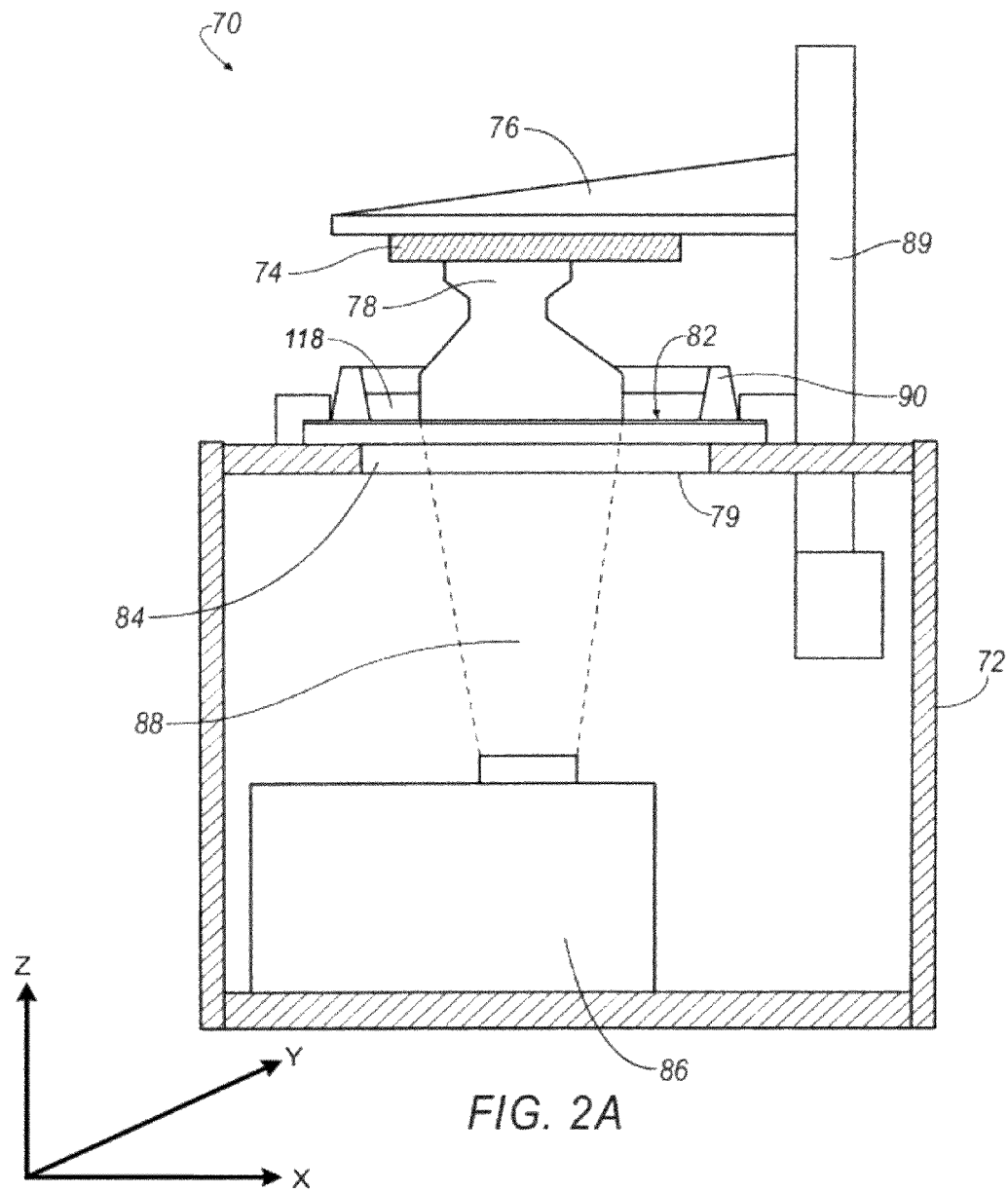
FIG. 2A is a cross-sectional view of an alternative embodiment of a system for making a three-dimensional object from a solidifiable material which includes a solidification substrate.
Figure 2B:
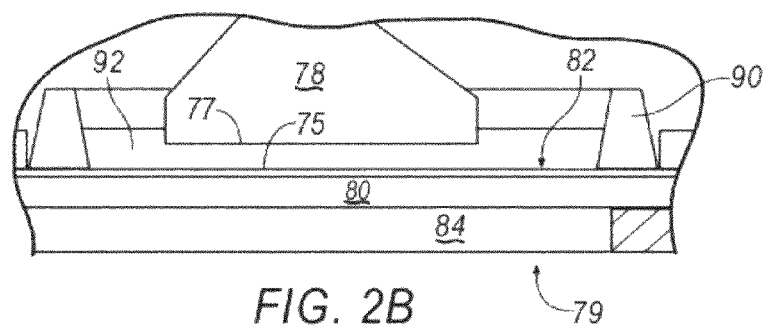
FIG. 2B is a cross-sectional detailed view of the system for making a three-dimensional object of FIG. 2A.

In FIGS. 1A-1B, the object 44 is progressively built in a vertically upward direction by moving build platform 46 progressively downward (in the z-axis direction) into resin container 42. However, other build orientations and directions may be used. FIGS. 2A-2B depict another system 70 for making a three-dimensional object 78 from a solidifiable material 92. FIG. 2A depicts system 70 with build platform 74 in one position relative to solidification substrate 79, while FIG. 2B depicts build platform 74 in another position relative to solidification substrate. In FIG. 2A, recently solidified material is adhered to solidification substrate 79, while in FIG. 2B, the recently solidified object surface 77 is spaced apart from solidification substrate 79 with freshly supplied solidifiable material 92 occupying the space therebetween. Solidifiable material 92 is of the type described previously for solidifiable material 41 in FIG. 1A. In system 70, a build platform 74 is suspended on a support 76 that is attached to an elevator 89. Elevator 89 progressively moves build platform 74 in a vertically upward direction (i.e., along the z-axis) during an object building operation. Pattern generator 86 is provided underneath build platform 74 and is disposed in housing 72. Pattern generator 86 projects an energy pattern 88 in an upward direction to solidify solidifiable material 92 contained in a trough 90. Although not separately shown in FIGS. 2A-2B, a control unit is provided to direct the actuation of elevator 88 and to provide the necessary image data to pattern generator 86. Pattern generator 86 is of the type described previously with respect to the pattern generator 50 of FIG. 1A.

The process of solidifying solidifiable may occur in discrete steps with the formation of discrete object layers or without the use of a layered formation process. In particular, a continuous build process may be used in which build platform 44 moves during the entire build process. Even with continuous build processes, due to possible electromagnetic radiation interruptions, some slight interface layer formation could still occur. Nevertheless, such interface formation can be minimized or even totally eliminated. It is further possible to dispense with the generation of sliced image data. Moreover, the relative movement between the build platform 44 and the solidification substrate 79 can be achieved in several ways. In one example, build platform 44 is moved while the solidification substrate 79 remains stationary. In another example, the solidification substrate 79 moves while the build platform 44 remains stationary. In the latter case, the level of solidifiable material 41 is preferably increased so that solidifiable material 41 remains in contact with solidification substrate 79 as the substrate moves.

When continuous build processes are used, structural "steps" that sometimes appear in the outer contours of objects built with layer processes can be minimized. In continuous build processes, the three-dimensional object 44, 78 is allowed to solidify or grow in the main building direction (typically in the Z-direction) without interrupting the supply of electromagnetic radiation during an irradiation phase and optionally during the whole building process. The corresponding continuous growth of solidifiable material 41 in the main building (Z) direction during an irradiation phase may thus proceed at an extent exceeding a usual hardening depth which was applied in the conventional layer-wise solidification and which is predetermined by the used supply of electromagnetic radiation and/or by a used polymerizable material.

By the layer-independent continuous operation, it is even possible to specifically influence and to control a current hardening depth of the solidifiable material 41. An adjustment of the speed of the build platform 46, 74 supporting the object 44, 78 to be generated moving away from the building surface, and an adjustment of the irradiation intensity of pixels (grey value or color value), respectively alone or in combination, are particular means for controlling the hardening depth.

Systems 40, 70 allow the provision of a three-dimensional object 44, 78 which has been formed by electromagnetic radiation of a solidifiable material 41 using a continuous construction method, but without separately polymerized structure elements that might be formed from layers, dots or strands of the photopolymerizable material. Unlike conventional stereolithography or other conventional free-form building techniques such as selective laser sintering, ballistic particle production, fusion deposition modeling, three-dimensional printing, three-dimensional plotting or other rapid prototyping processes, three-dimensional objects having no separate layers or individual material strands or dots can be provided through an uninterrupted continuous build process avoiding formation of layer lines or visible cross-sections in the Z direction. The technique is particularly suitable for providing a three-dimensional object which comprises different sectional areas in the direction of continuous material construction.

Referring again to FIGS. 2A and 2B, solidification substrate 79 is provided and is of the type described previously. Solidifiable material 92 disposed between object 78 and solidification substrate 79 (FIG. 2B) defines an exposed solidifiable material surface 75. Pattern generator 86 projects an energy pattern 88 onto exposed surface 75, causing the solidifiable material 92 to selectively harden in accordance with the projected pattern 88. In the example of FIGS. 2A-2B, solidification substrate 79 is generally of the type depicted and described in FIG. 3. Rigid or semi-rigid translucent layer 84a is mounted in a complementary opening formed in the upper surface of housing 72. Elastomeric translucent layer 80a is bonded to rigid or semi-rigid translucent layer 84a and is positioned vertically above rigid or semi-rigid translucent layer 84a. Protective film 82a is positioned above elastomeric translucent layer 80a. However, depending on the nature of the solidifiable material 92, the other solidification substrates depicted in FIGS. 4 and 5 may be used. As the object build process progresses, elevator 89 moves build platform 74 upward (i.e., along the build axis in the z-direction), which causes the lower surface 77 of object 78 to move away from solidification substrate 79, allowing additional solidifiable material 92 to then flow into the space between the solidified lower surface 77 of object 78 and solidification substrate 79 (FIG. 2B). Although not depicted, a system may also be provided for filling trough 90 with additional solidifiable material 92 based on a level of material 92 measured in trough 90.

In certain implementations of systems 40, 70, it can be difficult to separate the most recently formed object surface 54, 77 from solidification substrate 79 as build platform 46, 74 moves along the build axis. Accordingly, in FIG. 6 a method is provided for decreasing the required separation force. It has been discovered, that as an object is built, a given cross-section normal to the object build axis dimension (i.e., the axis along which the object is built) of the object can be solidified in multiple solidification steps so that at any one time, the surface area of solidifiable material 41 which solidifies while in contact with solidification substrate 79 is reduced relative to the area of exposed surface 54, 75. The method yields a reduced surface area of adhesion between object 44, 78 and solidification substrate 79 during at least a portion of an object build process, and therefore reduces the force required to separate object 44, 78 from solidification substrate 79 during that same portion of the process. In certain examples, the multiple solidification steps used to form a given surface of the object are performed when the build platform 46 is at different positions along the build axis (the z-axis in FIGS. 1-2B).

Figure 6:
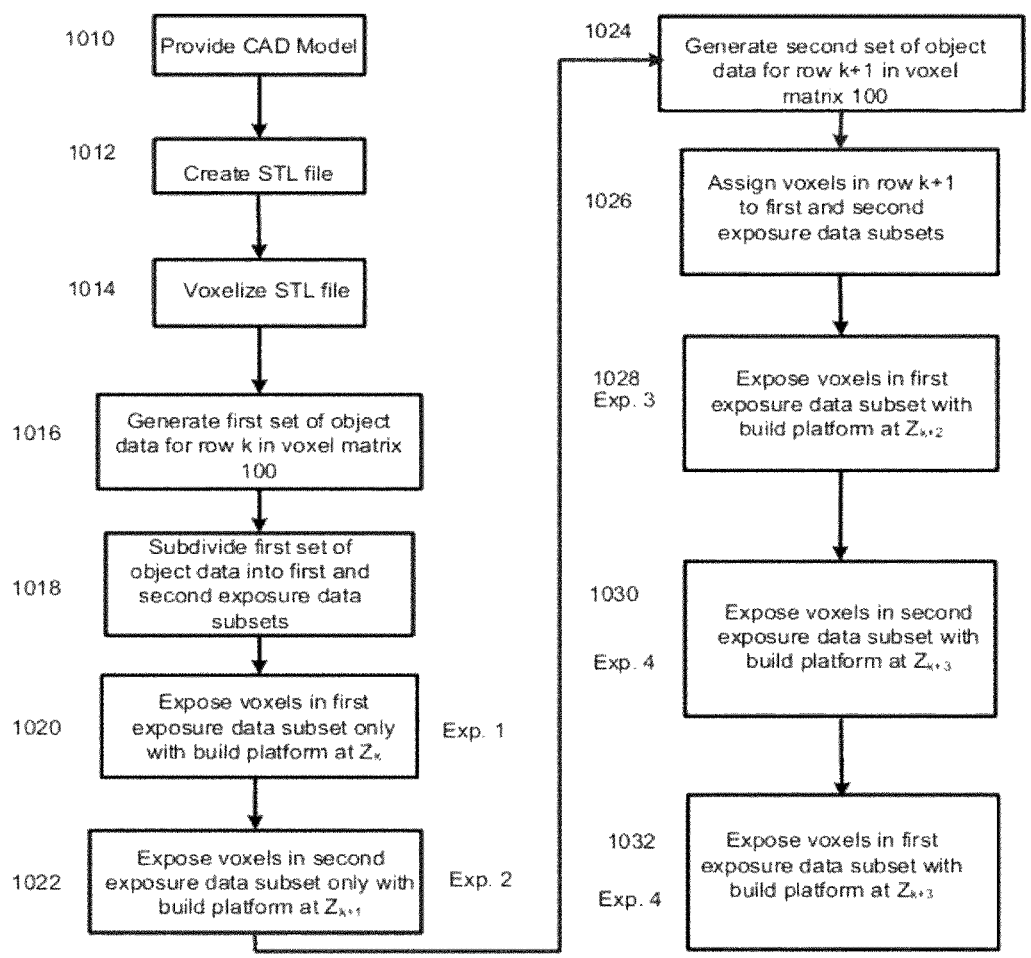
FIG. 6 is a flow chart depicting a method of alternately sequencing the exposure of different solidifiable material surface positions relative to a build axis during an object building operation using voxelized object data.

One example of a method for reducing the force required to separate object 44 from solidification substrate 79 is illustrated in the flow chart of FIG. 6. In the method of FIG. 6, voxelized data is used to represent the object being built. As will be discussed below, other object data formats such as sliced data and bitmaps may be used.

In step 1010, a CAD model of object 44 is provided. The CAD model is a computerized, three-dimensional data representation 102 of object 44. In step 1012, an STL file (i.e., a triangulated representation of a 3D surface geometry) is created from the CAD file.

Figure 7:
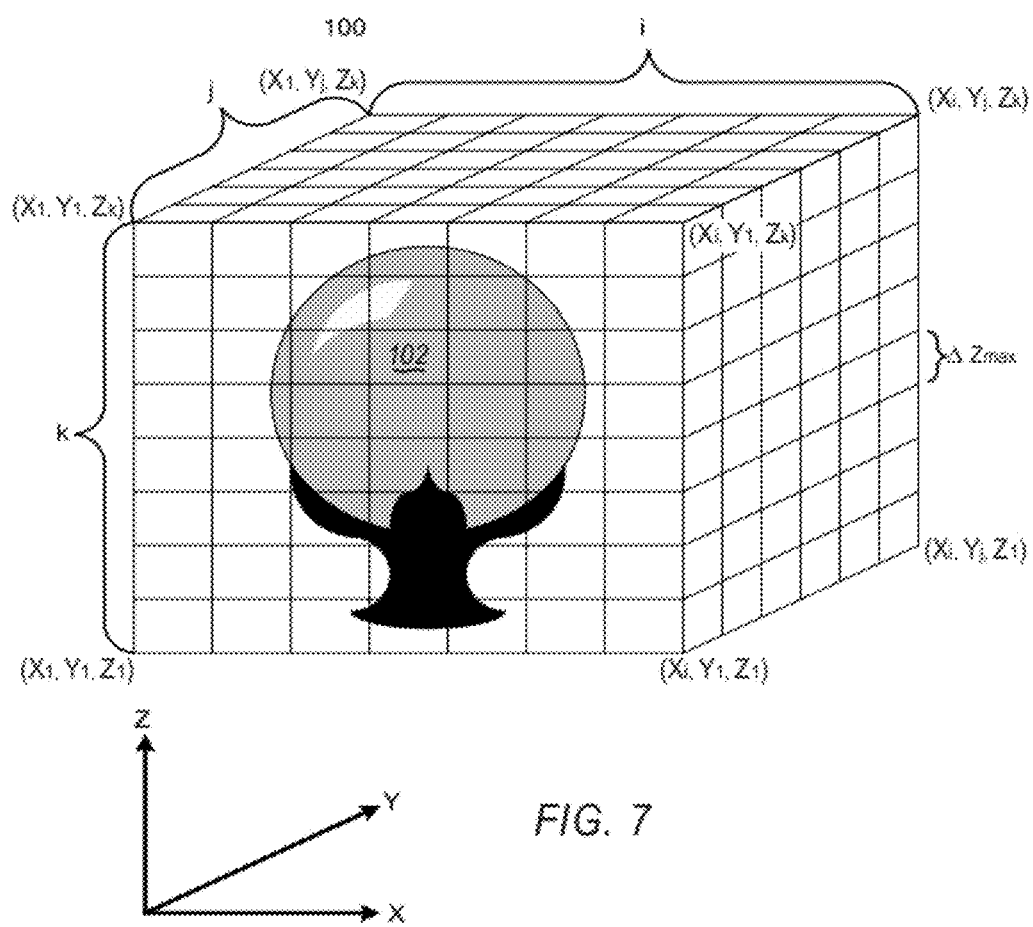
FIG. 7 is perspective view of a three-dimensional object in a voxel ("volumetric pixel") matrix.

In step 1014, a voxel file is created from the STL file. One exemplary illustration of the voxelization of an object model is depicted in FIG. 7. As shown in the figure, a three-dimensional voxel matrix 100 is defined. The voxel matrix 100 has a plurality of voxels, each with dimensions in the x,y, and z axes. Voxel matrix 100 has an index i that is indicative of a position along the x-axis, an index j that it is indicative of a position along the y-axis, and an index k that is indicative of a position along the z-axis. The voxel matrix 100 is superimposed over object representation 102. Based on the overlap of the object representation 102 with each voxel $(X_i, Y_j, Z_i)$ in the voxel matrix 100, object data is determined for each voxel. The object data may take a variety of forms. In one example, the percentage of each voxel's volume which is occupied by the object is calculated, and the percentage is used to assign at least one of a solidification depth ($\Delta Z$), an energy intensity, and a pattern generator exposure time to the voxel. A voxel that is fully occupied by the object data 102 would be assigned a z-value that is equal to the maximum solidification depth ($\Delta Z_{max}$) a given voxel. If energy intensity data is used, the intensity value for a voxel that is completely unoccupied by object representation 102 would be the minimum intensity for the pattern generator. The minimum intensity may be zero, but in certain examples will equal a non-zero intensity that is less than the intensity required to solidify the solidifiable material within the pattern generator exposure time. In contrast, if a voxel if fully occupied, the intensity may be set to the maximum intensity provided by the pattern generator 50.

In the example of FIGS. 6-7, object 102 is progressively built in the direction of a build axis that is defined by the direction of movement of the build platform 46, 74. In FIGS. 1-2b and 7-9c, the build axis is in the Z-direction. The method of FIG. 6 describes a method of forming four rows of voxels, k through k+3.

Figure 8B:
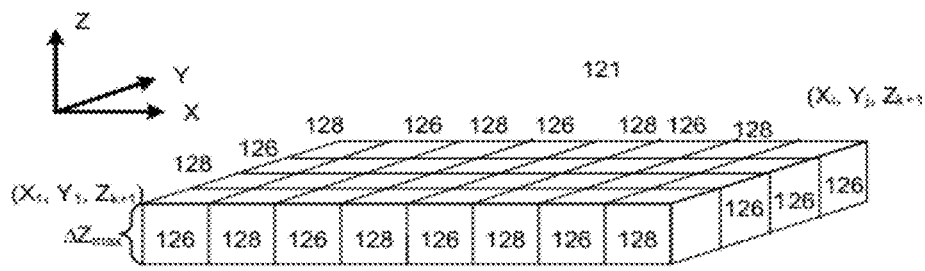
FIG. 8B is a perspective view of a second set of object data comprising a second voxel matrix row adjacent the first voxel matrix row of FIG. 8A.
Figure 8A:
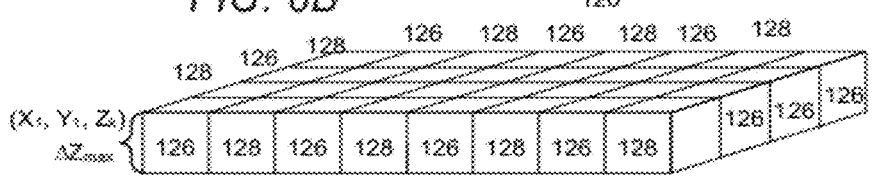
FIG. 8A is a perspective view of a first set of object data comprising a first voxel matrix row used to illustrate a method of alternately sequencing the exposure of exposure data subsets.
Figure 8E:
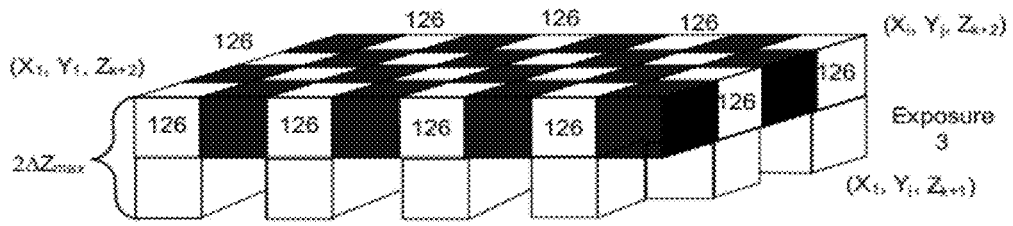
FIG. 8E is a perspective view of voxels in a first exposure data subset for a third build platform position along a build axis.

In step 1016, the voxel data is used to generate a first set of object data 120 (FIG. 8A) which comprises a set of voxels at a specific build axis location. In FIG. 8A, object data 120 corresponds to row k in voxel matrix 100. In FIG. 8A, the voxels in first set of object data 120 represent the voxels at row k that are fully occupied by object 102, even though the object 102 is not shown. Thus, they appear in white to indicate that they are to be solidified to the full voxel depth, $\Delta Z_{max}$.

In general, a position along the Z-axis of voxel matrix 100 will correspond to the position of build platform 46 along the build axis (e.g., Z-axis in FIGS. 1-2b) direction. The object-occupied voxels represented in first set of object data 120 could be solidified by simultaneous or substantially simultaneous exposure from pattern generator 50. They could also be solidified by sequential solidification with multiple pattern generator exposures while the build platform is at a specific build axis position. However, this approach may require an undesirably high force to separate the solidified material at exposed surface 55, 75 from solidification substrate 79 as the build platform 46, 74 moves away from the solidification substrate 79. Accordingly, in one illustrative example, the separation forces are reduced by using sequential exposures at different build platform positions along the build axis to solidify the object-intersecting voxels in a given row ($Z_k$) of the voxel matrix 100.

One approach for reducing the separation force is illustrated in step 1018. In step 1018, object-containing voxels are preferably sub-divided into first exposure data subset 126 and second exposure data subset 128. The exposure data subsets define positions of the voxels relative to the build axis (e.g., relative to the z-axis). In the example of FIGS. 8A-8G, the exposure data subsets comprise groups of x and y coordinates, and each voxel is assigned to one of the subsets based upon its position relative to the build axis (i.e., based on its x, y position). Voxels in first exposure data subset 126 and second subset of exposure data 128 are solidified at separate times and during different exposure steps when the build platform 46, 74 is at different build axis locations. In addition, a given row of object-containing voxels may be subdivided into more than two exposure data subsets.

The exposure data subsets 126 and 128 can be configured in a number of different ways, but preferably are configured in a generally symmetrical pattern to prevent localized areas of concentrated separation force between the object 102 and the solidification substrate 79. In one embodiment, the first exposure data subset 126 and the second exposure data subset 128 define an alternating sequence of first exposure data subset 126 members (e.g., voxels) and second exposure data subset 128 members. In one example, the exposure data subsets define an alternating sequence in one direction (e.g., the x or y axis). In another example, the exposure data subsets define a first alternating sequence in one direction (e.g., the x-axis) and a second alternating sequence in a second direction (e.g., the y-axis).

As best seen in FIGS. 8A-8G, in one example, the voxels in first exposure subset 126 and second exposure subset 128 define a "checkerboard" pattern, wherein each voxel in first exposure subset 126 is adjacent at least three (3) voxels in second exposure subset 128 and vice-versa. In the example of FIGS. 8A-8G, the first exposure data subset 126 and second exposure data subset 128 define a first alternating sequence of first and second exposure data subset members in the x-direction and an orthogonally-oriented second alternating sequence of first and second exposure data subset members in the y-direction, as seen in FIG. 8A.

Figure 8D:
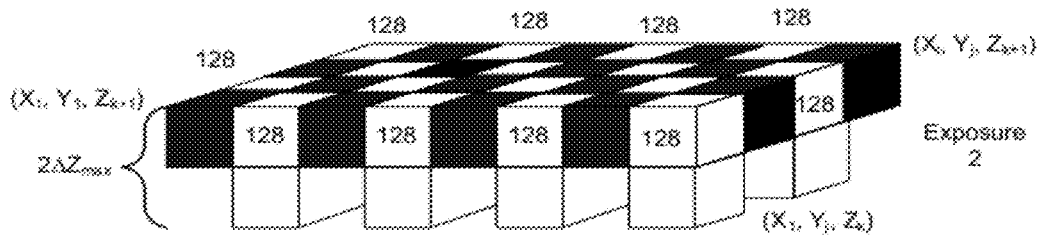
FIG. 8D is a perspective view of voxels in a second exposure data subset for a second build platform position along a build axis.
Figure 8C:
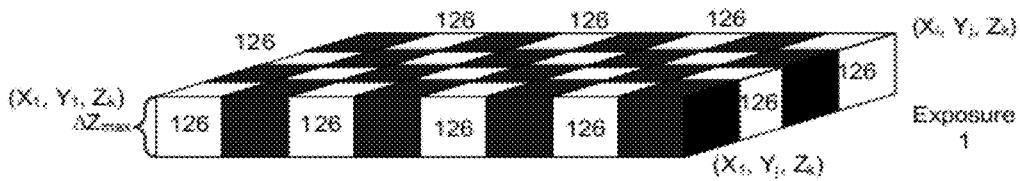
FIG. 8C is a perspective view of voxels in a first exposure data subset of the first set of object data of FIG. 8A for a first build platform position along a build axis.

In the method of FIG. 6, an initializing step 1020 is first performed to begin the process of alternately exposing the exposure data subsets 126 and 128. In the initializing step, voxels in the first exposure data subset 126 are solidified to a depth that is equal to a maximum incremental object thickness defined for the object. In the case of voxel data, the maximum incremental voxel thickness is the maximum single voxel solidification depth, $\Delta Z_{max}$. In step 1020, the voxels in first exposure data subset 126 are solidified without solidifying voxels in the second exposure data subset 128. As illustrated in FIG. 8C, voxels in first exposure data subset 126 are exposed (Exposure 1) on a first exposure surface 55, 75 of the solidifiable material without exposing voxels in second exposure subset 128, as illustrated in FIG. 8C. The term "first exposure surface" is used to refer to the surface 55, 75 of the solidifiable material upon which energy from the pattern generator 50 is incident. After an exposure, the solidifiable material at the first exposure surface generally solidifies in contact with and removably adheres to the solidification substrate 79. However, as the build platform, 44,74, moves away from the solidification substrate 79, fresh solidifiable material is provided between the most recently solidified object surface 55 and the solidification substrate, thus providing a "second exposure surface."

As indicated by their black coloring, in step 1020, the voxels in second exposure subset 128 are provided with no solidification energy or a solidification energy that is insufficient to solidify the solidifiable material at the corresponding voxel locations. Exposure 1 of FIG. 8C is performed when the build platform is at a build axis location that corresponds to voxel row k of first set of object data 120. The depth of solidification of each voxel in first exposure data subset 126 is preferably the maximum single voxel solidification depth, $\Delta Z_{max}$, at the maximum pattern generator intensity and exposure time. Because only the voxels in first exposure data subset 126 are solidified, the area of solidified material that is in contact with solidification substrate 79 is reduced relative to a method wherein the voxels in both subsets 126 and 128 are solidified, thereby minimizing the potential for damaging the object being built or separating it from the build platform 44, 74.

In step 1022, the voxels in second exposure subset 128 of first set of object data 120 are exposed during Exposure 2. However, during Exposure 2 the build platform 44, 74 is at a build axis location that corresponds to the voxel matrix row k+1 in the Z-direction. Therefore, the voxels in second exposure subset 128 of voxel matrix row k are two voxel rows from the exposed solidification material surface 54, 74. As a result, during Exposure 2, a greater depth of solidification is required to reach the voxels in second exposure subset 128 of voxel matrix row k. To accomplish the greater solidification depth, during Exposure 2 an increased energy intensity is applied. In the example of FIG. 8D, the voxels in the second exposure data subset receive twice the total electromagnetic radiation exposure (i.e., ∫Idt) received by the voxels in the first exposure data subset during the initialization step 1020 and Exposure 1. Other techniques may also be used to increase the solidification depth, such as increasing the pattern generator exposure time or increasing both the pattern generator exposure time and the energy intensity. Following step 1022, a solidification depth of twice the maximum voxel depth, or $2\Delta Z_{max}$ is obtained, which solidifies the voxels in second exposure subset 128 which are located in both voxel matrix rows k and k+1. As a result, all of the object-containing voxels in row k are solidified.

The foregoing process can be repeated for those voxel rows in which the object profile remains constant in the x, y plane. Thus, in step 1024, a second set of object data 121 (FIG. 8B) may be extracted or generated for row k+1 of the voxel matrix. The voxels in second set of object data 121 may be assigned to one of the two exposure data subsets 126 and 128 (step 1026). Thus, in step 1028, the build platform is at a position $Z_{k+2}$ corresponding to the k+2 row of voxel matrix 100, and the voxels in the first exposure data subset 126 are exposed (Exposure 3) to a depth of $2\Delta Z_{max}$ (FIG. 8E), while those voxels in second exposure data subset 128 are not solidified. Following step 1028, all of the object-containing voxels will be solidified in both rows k and k+1.

As indicated above, the method of FIG. 6 is used to illustrate the solidification of object-containing voxels in four voxel rows. The four voxel rows define first, second, and third sets of object data. However, only the first two sets of object data, 120 and 121, are illustrated in FIGS. 8A-8G. The third set of object data would correspond to voxel matrix row k+2, and the fourth set of object data would correspond to voxel matrix row k+3. Both the third and fourth sets of object data comprise voxels at the same x, y locations and having the same solidification depths as those of the first and second object data sets 120, 121.

Figure 8G:
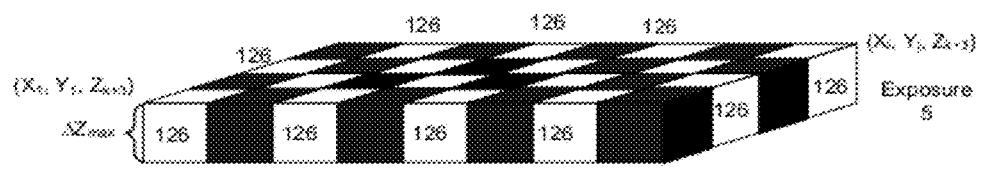
FIG. 8G is a perspective view of voxels in a first exposure data subset for a fourth build platform position along a build axis.
Figure 8F:
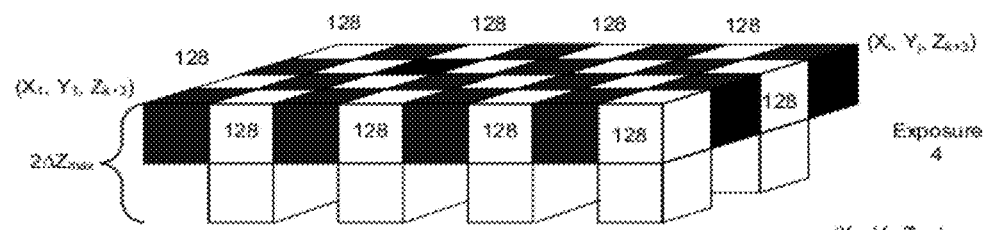
FIG. 8F is a perspective view of voxels in a second exposure data subset for a fourth build platform position along a build axis.

In the example of FIGS. 8A-8G, the fourth voxel row, k+3 is the "terminating" row at which the alternating exposure method of FIG. 6 is concluded. To produce a continuous object surface 54 for the k+3 row, all of the object-containing voxels in that row are preferably simultaneously or sequentially exposed while the build platform is at the same position, $Z_{k+3}$. As the build platform moves to a position $Z_{k+3}$ (corresponding to voxel matrix row k+3), the voxels in second exposure data subset 128 may then be exposed in Exposure 4 (step 1030) to a solidification depth of $2\Delta Z_{max}$ (FIG. 8F). The process is then terminated in step 1032 by solidifying the voxels in first exposure data subset 126 while the build platform is at position $Z_{k+3}$ (FIG. 8G).

As the foregoing discussion suggests, for each section of a voxel matrix (e.g., each set of rows, k) where the cross-section is unvarying, the method of FIG. 6 can be carried out with an initiating exposure step 1020 (FIG. 8C) wherein the maximum solidification depth corresponds to the maximum voxel depth ($\Delta Z_{max}$), and intermediate steps wherein the maximum solidification depth is a multiple thereof (e.g., $2\Delta Z_{max}$). When the last voxel matrix row is reached within the section of constant cross-sectional profile, a terminating exposure step 1032 (e.g., FIG. 8G) is carried out wherein the last exposure is performed at the same build platform location as the previous exposure, but the solidification depth is the maximum voxel depth ($\Delta Z_{max}$).

Figure 9A:
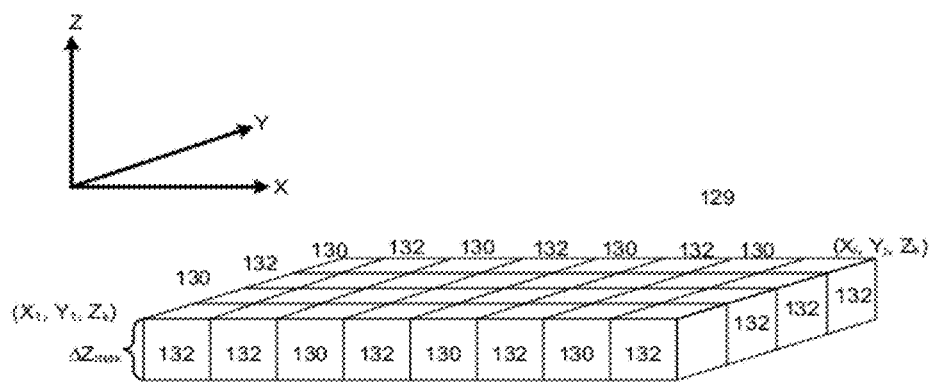
FIG. 9A is a is a perspective view of a first set of object data comprising a first voxel matrix row used to illustrate an alternative method of alternately sequencing the exposure of exposure data subsets.

The exposure data subsets used with the present method are not confined to the checkerboard pattern of FIGS. 8A-8G. Any suitable exposure data subset pattern that effectively reduces the surface area of adhesion between a solidified surface of object 44, 78 and solidification substrate 79 may be used. Another example of such a pattern is provided in FIGS. 9A-9B. In FIG. 9A, a first set of object data 129 is provided which includes the object-containing voxels at a given row, k, of voxel matrix 100. First set of object data 129 is subdivided into two subsets of exposure data, first set 130 and second set 132. Each subset comprises positions relative to the build axis (e.g., x, y coordinates if the build axis is in the z-direction).

As indicated in the figures, the first and second subsets of exposure data 130 and 132 define an alternating sequence of first exposure data subset 130 and second exposure data subset 132 in the x-direction, but not in the y-direction. Thus, a stripe-like pattern is provided, wherein rows containing voxels of the first exposure data subset 130 are spaced apart from one another along a dimension (the x-axis) of the voxel matrix 100, as are rows containing voxels of the second exposure data subset 132.

Figure 9C:
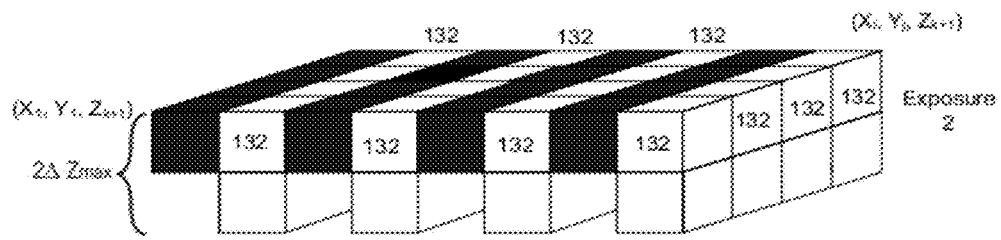
FIG. 9C is a perspective view of a second exposure data subset for a second build platform position along the build axis.
Figure 9B:
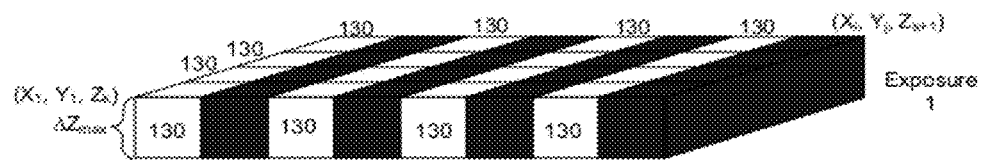
FIG. 9B is a perspective view of voxels in a first exposure data subset of the first set of object data of FIG. 9A for a first build platform position along a build axis.

FIG. 9B depicts an initialization exposure step. As indicated in the figure, when the build platform 46, 74 is at a build axis location corresponding to voxel matrix row k, the object-containing voxels of first exposure data subset 130 are solidified (Exposure 1) to a maximum solidification depth that equals the maximum single voxel depth $\Delta Z_{max}$ of the voxel matrix. As indicated earlier, the solidification depth may be controlled by adjusting the intensity of energy supplied by pattern generator 50 to the x, y locations containing the first exposure data subset 130 and/or the exposure time for those locations. However, during this exposure step, the object-containing voxels of second exposure data subset 132 are provided with an insufficient amount of solidification energy to effect solidification. In the case of a photopolymeric resin, the energy provided would be insufficient to initiate polymerization and/or curing.

The exposure step depicted in FIG. 9B is essentially an initiating step such as step 1016 of FIG. 6. As shown in FIG. 9C, when the build platform reaches a location corresponding to voxel matrix row k+1, the object-containing voxels in second exposure data subset 132 are solidified to a depth that is twice the maximum solidification depth $\Delta Z_{max}$. As a result, the object-containing voxels of second exposure data subset 132 at row k are solidified as are those at row k+1. The process can then be continued and ultimately terminated in a fashion similar to that described above for FIGS. 8A-8G.

One advantage of the exposure data subset configuration of FIGS. 9A-9C is that it forms a plurality of channels in the exposed surface 54 of the object 44, 78, 102. Solidifiable material (e.g., uncured resin) may flow through the channels and away from the object 44, 78, 102 during the build process, which improves the smoothness of the exposed surface 55 of the solidified material and reduces the time required to obtain a smooth surface. In certain embodiments of three-dimensional object manufacturing systems such as systems 40 and 70, a tilting or peeling mechanism is provided to facilitate separating the exposed part surface 54, 75 from the solidification substrate 79. If a tilting or peeling mechanism is provided, the axis of tilting is preferably perpendicular to the lengths of the channels to facilitate drainage of solidifiable material through the channels. For example, in one example, system 70 of FIG. 2A includes a mechanism for tilting the trough 90 about a pivot axis parallel to the x-axis. In such a case, the channels (and hence the rows defined by exposure data subsets 130 and 132 would preferably run along the y-axis.

The method of FIG. 6 can be used with voxelized data as well as with pixelized, two-dimensional data wherein any given pixel receives a minimum amount of energy or a maximum amount of energy, with no gradation in energy levels. As indicated previously, the method can also be used with "gray scaling" (preferably in border regions of the object) in which voxels are assigned intensity values ranging from a minimum intensity to a maximum intensity. In one example wherein the intensity value is represented as an 8-bit number, the intensities range from 0 (minimum intensity) to 255 (maximum intensity).

In addition, the voxelized or pixelized data may be stored as two-dimensional "bit maps." In the example of FIGS. 8A-8G, the object data is represented as voxels, each of which has an x, y, and z dimension. However, the object data may also be represented as two-dimensional bit map data. The bit map data may be generated from voxelized data such as that shown in FIGS. 7, 8A-8G and 9A-9C. However, it may also be obtained by slicing an object file into discrete slices. For example, object 102 in FIG. 7 may be represented as a plurality of object data slices along the Z-axis, each of which has a uniform thickness. Because the thickness is uniform for each slice, each pixel need not have a uniquely assigned total exposure, intensity, or exposure time. Thus, each bitmap will be defined by an x and y coordinate and data indicating whether the pixel is to be exposed to solidification energy or is not to be exposed to solidification energy. Thus, a pixel could be represented as ($X_i, Y_i$, ON) or ($X_i, Y_i$, 1) to indicate that the pixel is to be solidified. A pixel could be represented as ($X_i, Y_i$, OFF) or ($X_i, Y_i$, 0) to indicate that the pixel is not to be solidified. Each bitmap would then correspond to build platform position along the build axis (Z-direction).

Figure 11A:
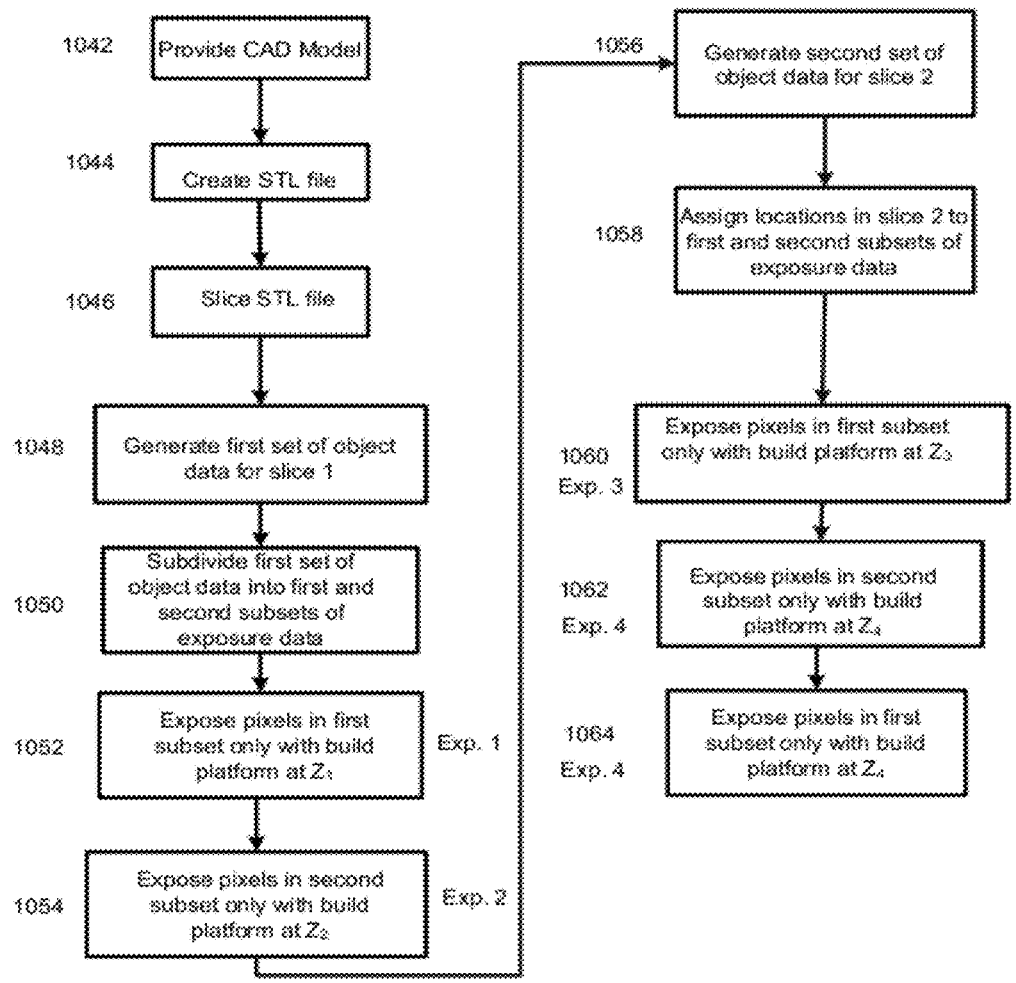
FIG. 11A is a flow chart depicting a method of alternately sequencing exposure data subsets of sliced object data.
Figure 11B:
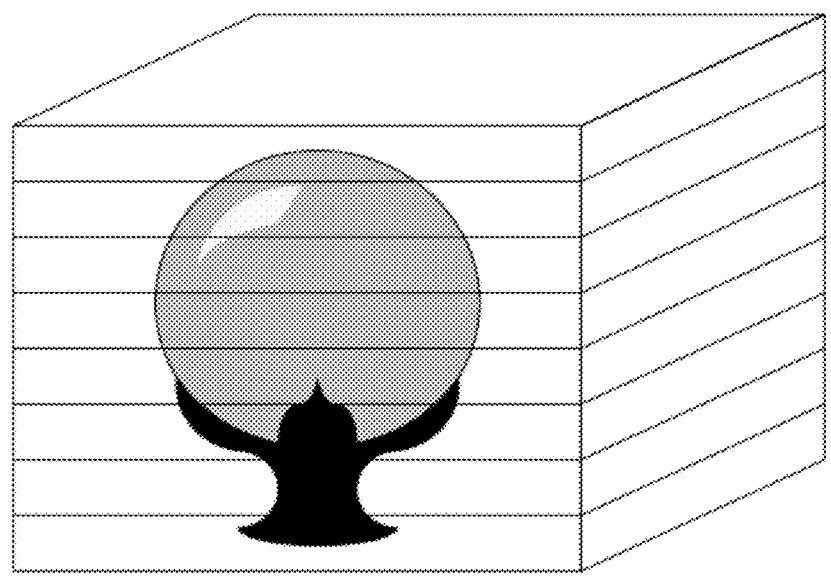
FIG. 11B is a depiction of the slicing of an object used to create sliced object data files.
Figure 11B:
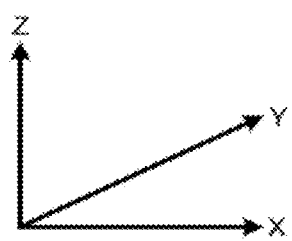
Figure 12A:
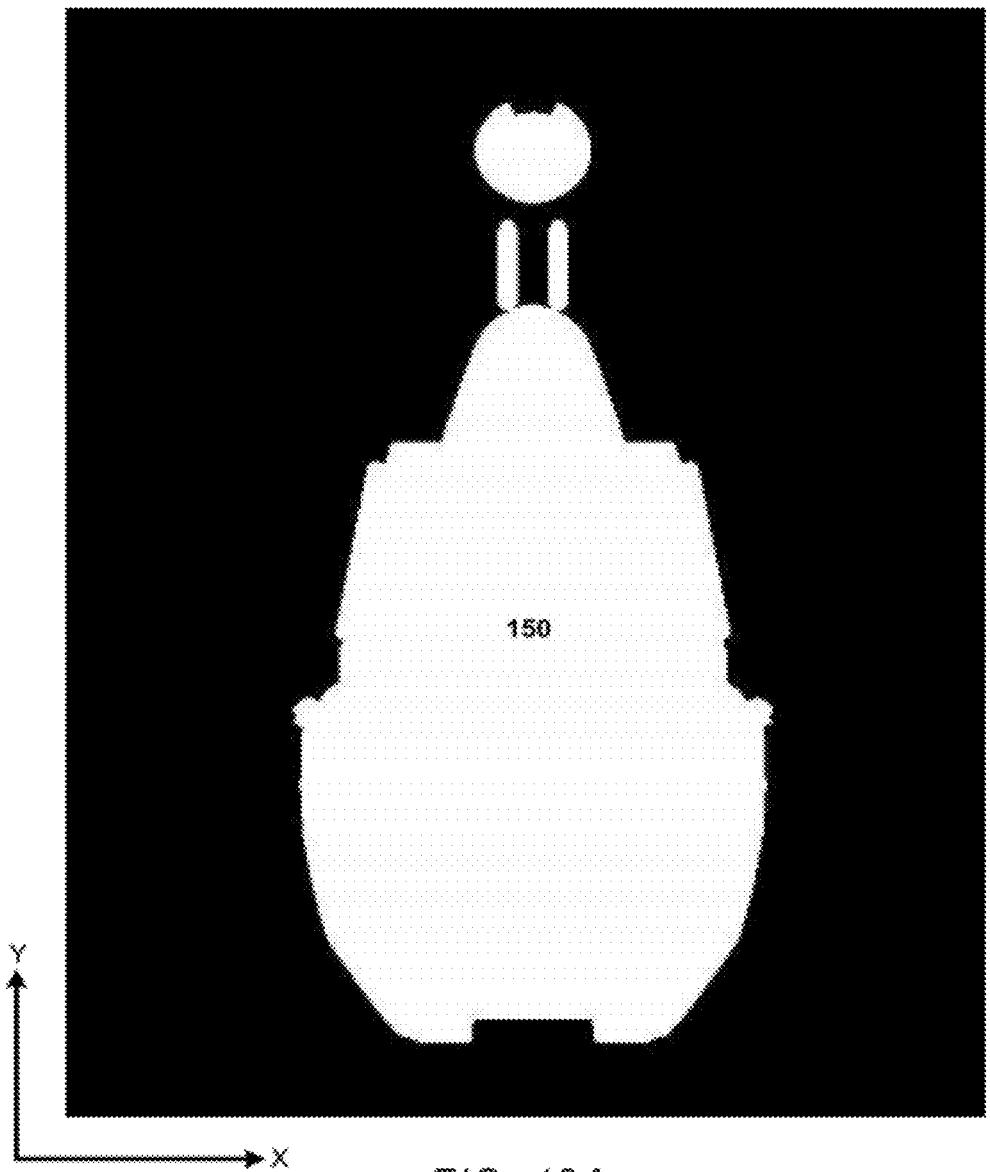
FIG. 12A is a bitmap for a first set of sliced object data used to illustrate a method of alternately sequencing the exposure of exposure data subsets of sliced object data.
Figure 12B:
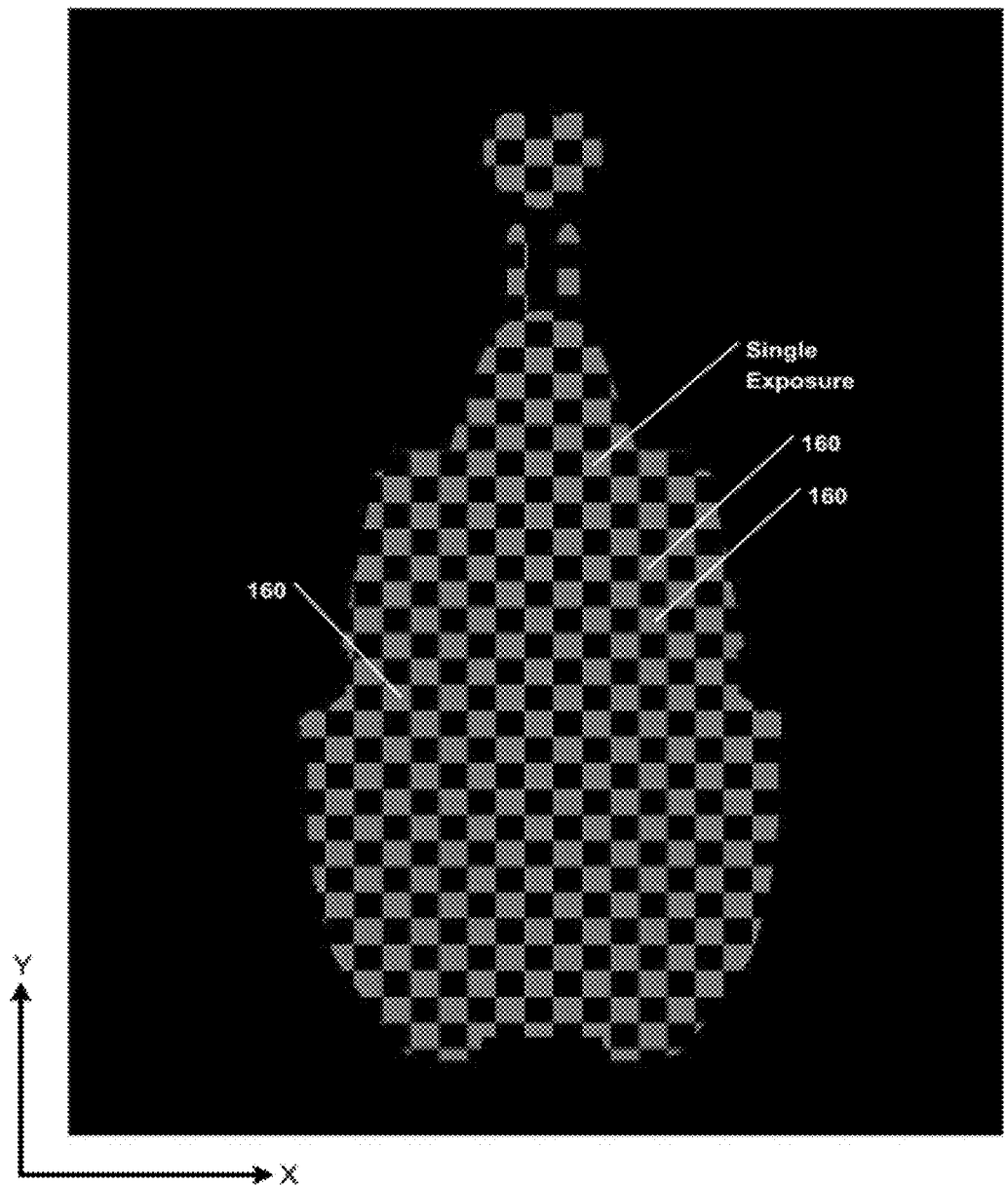
FIG. 12B is a top plan view of pixels in a first exposure data subset for a first build platform position along a build axis.
Figure 12C:
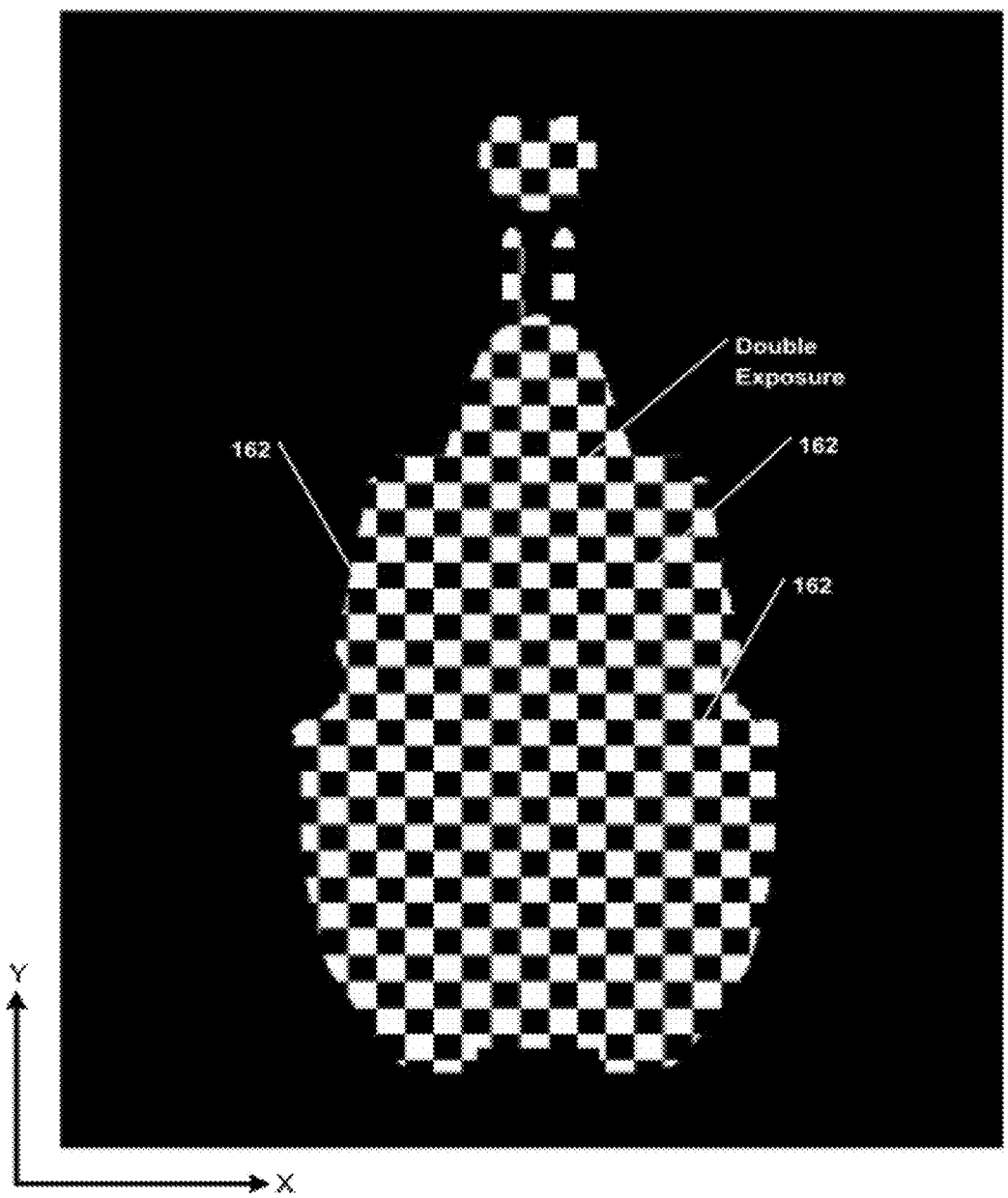
FIG. 12C is a top plan view of a pixels in a second exposure data subset for a second build platform position along a build axis.
Figure 12D:
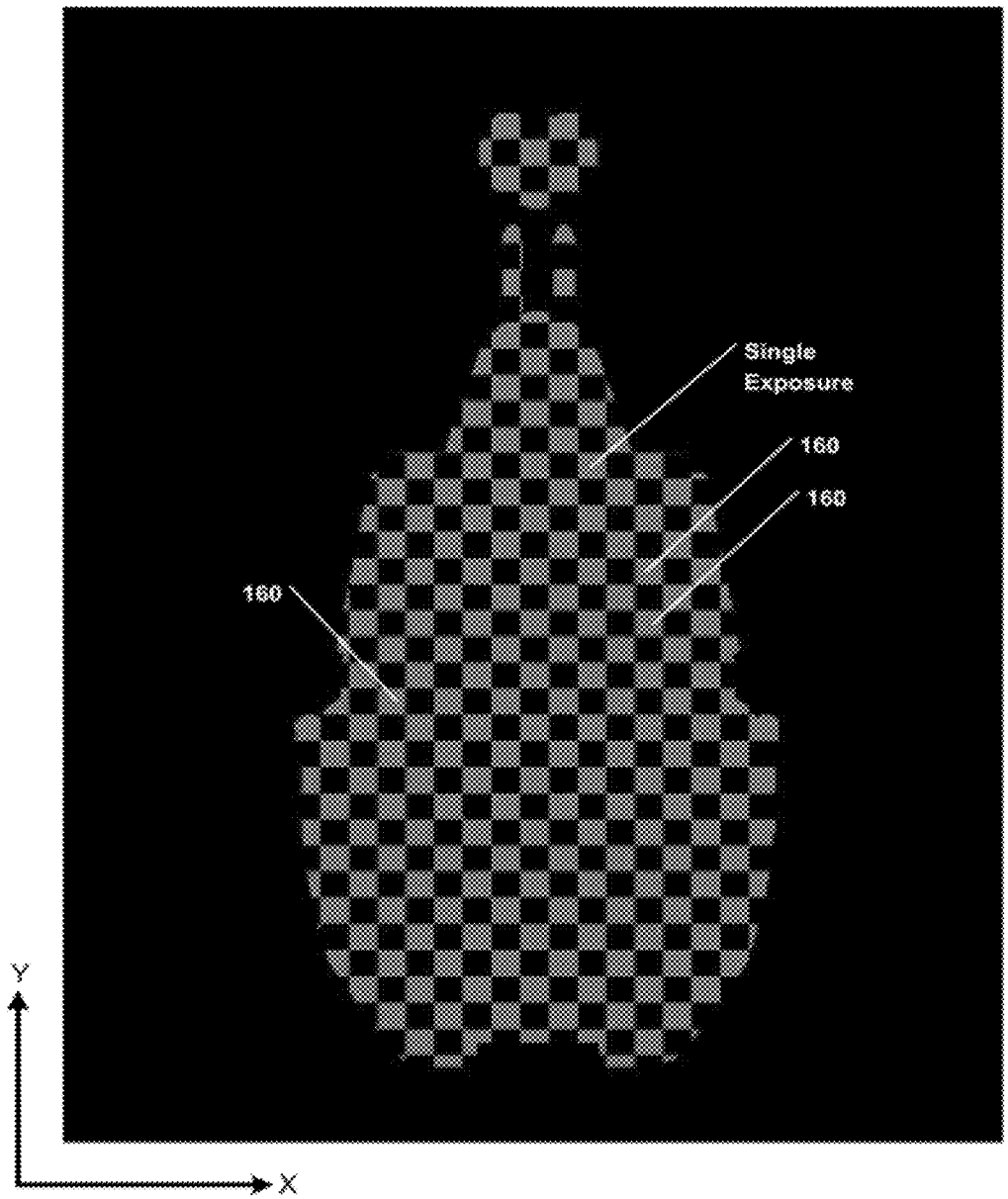
FIG. 12D is a top plan view of pixels in a first exposure data subset for a second build platform position along a build axis.

A flow chart of an exemplary method of using sliced data instead of voxelized data is provided in FIG. 11A. As shown in the figure, a CAD model is provided in step 1042 and is converted to an STL file in step 1044. In step 1046, the CAD model is sliced into a plurality of slice files (FIG. 11B) that each have a defined thickness and correspond to a build platform 44, 74 position along the build axis. The first sliced data file is used to create a first set of object data in step 1048, which is represented as first set of object data 150 in FIG. 12A. The object data identifies those x, y locations that are to be solidified. In step 1050, first set of object data 150 is subdivided into first exposure data subset 160 and second exposure data subset 162, as shown in FIGS. 12A-12D. As with the previous examples, first exposure data subset 160 and second exposure data subset 162 define locations relative to the build axis (e.g., x and y coordinates). The exposure data subsets 160 and 162 may be configured in variety of different ways, such as the alternating sequence(s) of first exposure data subset members and second exposure data subset members described previously. The alternating sequence may include an alternating sequence in the x-axis direction and/or in the y-axis direction. In the example of FIGS. 12A-12C, a checkerboard pattern is used in which the sequence alternates in both the x and y-axis directions.

As with the method of FIG. 6, an initialization step 1052 is provided in the method of FIG. 11A. In step 1052, the pixels in first exposure data subset 160 are exposed to energy from pattern generator 50 for a solidification time $t_1$ without exposing pixels in second exposure data subset 162. The solidification depth $t_1$ is the time required to solidify the solidifiable material to a depth equal to the slice thickness given the intensity applied by the pattern generator and the nature of the solidifiable material. The exposure of the first exposure data subset 160 is depicted in FIG. 12B. The pixels shown in gray are exposed for exposure time $t_1$ while those shown in black are either not exposed or are exposed for a time that is insufficient to cause solidification at the specified energy intensity. In FIGS. 12A-12D, the color gray is not used to depict intensity variations, but rather, exposure time variations. In FIG. 12B, the exposure of first exposure data subset 160 is performed while the build platform 44, 74 is at a first build axis position, $Z_1$. After the build platform 44, 74 moves further away from solidification substrate 79 to a second build platform position ($Z_2$), in step 1054, the pixels in second exposure data subset 162 are exposed to solidification energy from pattern generator 50 without exposing the pixels in first exposure data subset 160 (FIG. 12C). However, in step 1054, the solidification time that is used to solidify the pixels in second exposure data subset 162 is $2*t_1$, which solidifies pixels in the second exposure data subset 162 in both the first and second slices. Thus, the process is similar to the process depicted in FIGS. 8A-8G and 9A-9C. However, exposure time is varied instead of the energy intensity to achieve the required depth of solidification.

The exposure of first and second exposure data subsets 160 and 162 as shown in FIGS. 12B and 12C effectively solidifies the active pixels in first object data set 150, and therefore, solidifies the first slice. In step 1056, second object data set 152 is generated (not separately shown in figures). Second object data set 152 represents the next slice file after first object data set 150 and defines a cross-sectional object profile that is the same as that of first object data set 150. Thus, in step 1058 pixels in second object data set 152 are assigned to first exposure data subset 160 and second exposure data subset 162. In step 1060, pixels in first exposure data subset 160 of second object data set 152 are exposed to solidification energy for an exposure time of $2*t_1$ (not separately shown in figures) with the build platform at a third build platform position, $Z_3$. In step 1064, pixels in second exposure data subset 162 are exposed for an exposure time $2*t_1$ with the build platform at a fourth build platform position. Thus, the sequence of alternating the exposure of first and second exposure data subsets 160 and 162 continues until a terminating step (e.g., a change in the object cross-sectional profile or the completion of an object build). In a terminating step, depicted in FIG. 12D, pixels in first exposure data subset 160 are exposed for a single exposure time ($t_1$) either simultaneously with or subsequent to the exposure of pixels in second exposure data subset 162 for an exposure time of $2*t_1$.

When the cross-sectional profile of the object transitions from one profile to another, a terminating step similar to that of FIGS. 8F and 8G is used. In the step 1062, the pixels in second exposure data subset 162 are exposed for an exposure time that is twice that of the exposure time used in the initiating step (i.e., $2*t_1$) with the build platform at a fourth position along the build axis, $Z_4$. In the terminating step 1064, the pixels in first exposure data subset 160 are again exposed for an exposure time equal to that of the initiating step (i.e., $t_1$). However, both of the exposures are of steps 1062 and 1064 are performed at the same build platform 44, 74 location ($Z_4$) along the build axis.

Figure 13:
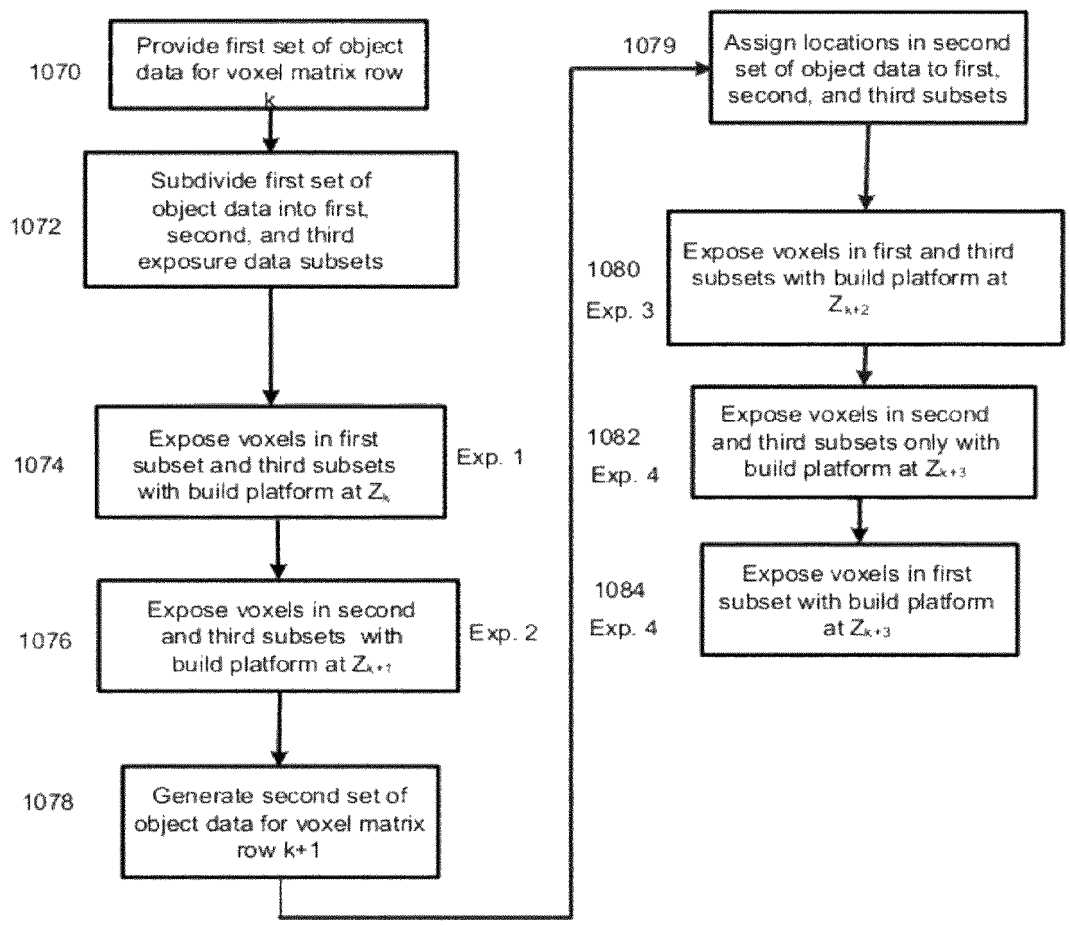
FIG. 13 is a flow chart depicting a method of alternately sequencing the exposure of certain positions on the surface of a solidifiable material relative to a build axis and non-alternately sequencing the exposure of other positions on the surface of a solidifiable material relative to the build axis.

The methods described herein may be used for a portion of a bitmap or voxel row while the remainder of the object-containing voxels or exposed pixels are exposed in accordance with the object data corresponding to the bitmap or voxel row (i.e., the pixels are not exposed in alternating sequences). An example of such a method is depicted in FIG. 13. The method is illustrated with reference to a voxelization method, but it is also suitable for use with a sliced data/pixel approach. In accordance with the method, a first set of object data 170 (FIG. 14A) is provided in step 1070 by slicing or voxelizing a CAD file in the manner discussed previously. In step 1072, the first set of object data for voxel matrix row k is subdivided into three exposure data subsets 172, 174, and 176, each of which defines locations relative to the build axis (e.g., x and y coordinates on a Cartesian coordinate system with a build axis in the z-direction). As shown in FIGS. 14A-14E, the voxels in first exposure data subset 172 and second exposure data subset 174 define an alternating sequence of members of the subsets 172 and 174 which may alternate in the x and/or y-axis directions. In FIGS. 14A-14E, a checkerboard pattern is used (i.e., subsets 172 and 174 alternate in both the x and y directions).

The voxels in third exposure data subset 176 are not part of the alternating sequence of exposure data subsets. Instead, they represent a region where the solidification depth is not altered between exposures.

In step 1074, an initiating step is performed in which the voxels in first exposure data subset 172 are solidified to a depth equal to the maximum single voxel depth $Z_{max}$ (FIG. 14C) while the build platform is at a first position, $Z_k$, by appropriately setting the energy intensity and/or exposure time. During step 1072, the voxels in second exposure data subset 174 are either not exposed to solidification energy or are exposed to an energy intensity that is insufficient to solidify the solidifiable material at the specified solidification time (e.g., curing time). However, the voxels in third exposure data subset 176 are solidified to a depth equal to the maximum voxel depth, $Z_{max}$.

In step 1076, voxels in second exposure data subset 174 are solidified to a depth that is equal to twice the maximum voxel depth (i.e., $2\Delta Z_{max}$) (FIG. 14D) while the build platform is at a second position along the build axis, $Z_{k+1}$. During step 1076, voxels in first exposure data subset 172 are not solidified.

However, the voxels in third exposure data subset 176 are again solidified to a voxel depth that equals the maximum voxel depth $\Delta Z_{max}$.

Figure 14B:
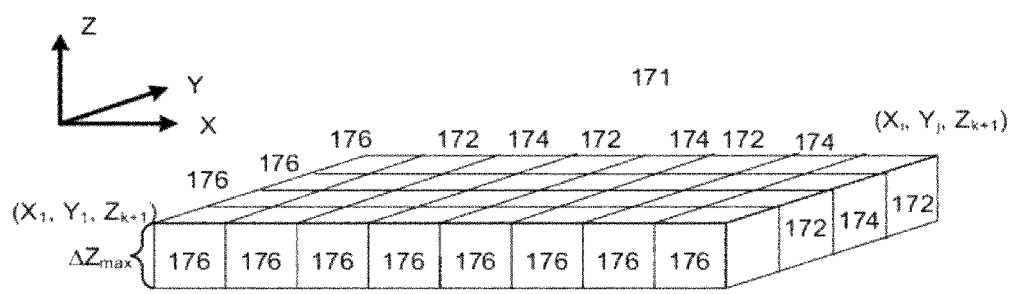
FIG. 14B is a perspective view of voxels in a second set of object data used to illustrate the method of FIG. 13.
Figure 14A:
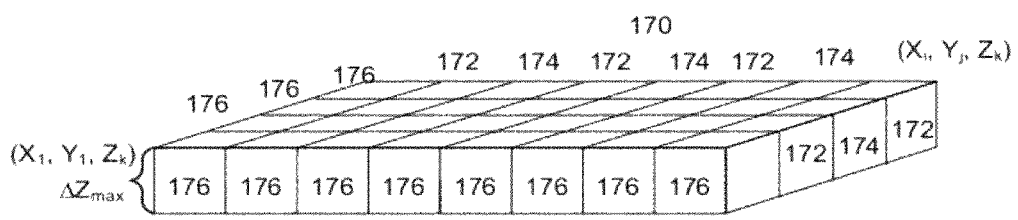
FIG. 14A is perspective view of voxels in a first set of object data used to illustrate the method of FIG. 13.
Figure 14F:
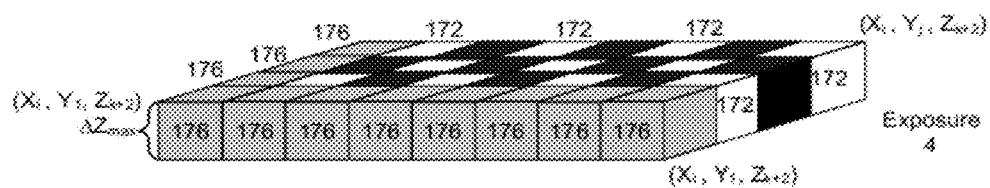
FIG. 14F is a perspective view of voxels in a second exposure data subset for a third build platform position along a build axis.
Figure 14E:
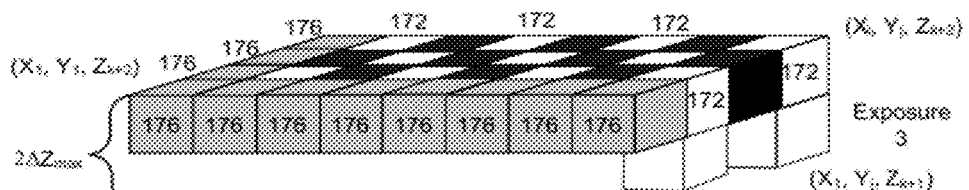
FIG. 14E is a perspective view of voxels in a first exposure data subset for a third build platform position along a build axis.
Figure 14D:
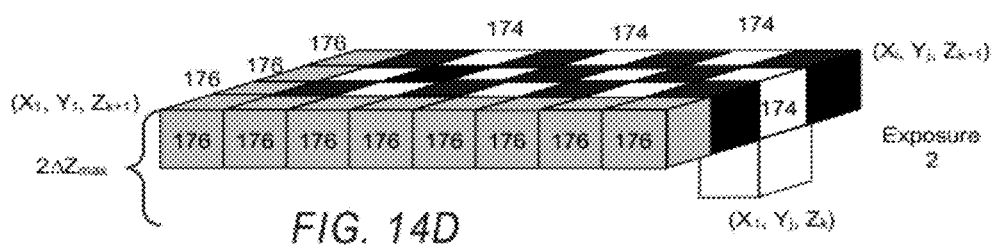
FIG. 14D is a perspective view of voxels in a second exposure data subset for a second build platform position along a build axis.
Figure 14C:
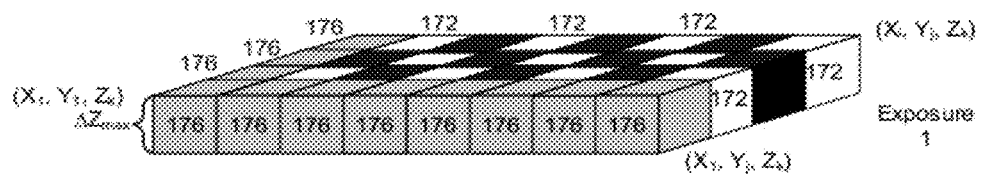
FIG. 14C is a perspective view of voxels in first exposure data subset for a first build platform position along a build axis.

In step 1078, second object data set 178 is extracted or generated corresponding to voxel row k+1. In accordance with the method, second object data set 178 defines an object cross-sectional profile that is identical or substantially identical to that of first object data set 170. Accordingly, second object data set 178 is again subdivided into three exposure data subsets 172, 174, and 176 (step 1079). In step 1080, the voxels comprising first exposure data subset 172 are solidified to a solidification depth that is twice the maximum voxel depth ($2\Delta Z_{max}$) while the build platform is at a position $Z_{k+2}$ along the build axis, at which point both first and second object data sets 170 and 172 are solidified (FIG. 14E). If a third object data set (not shown) is provided and is the terminal object data set (i.e., the last set in the object build process or the last data set before a cross-sectional profile transition occurs), then in step 1082 the voxels comprising second exposure data subset 174 are solidified to a solidification depth of $2\Delta Z_{max}$ while the build platform is at a fourth position $Z_{k+3}$ along the build axis, and in step 1084 the voxels in third exposure data set 176 and first exposure data set 172 are solidified to a solidification depth of $\Delta Z_{max}$ while the build platform is at the fourth position $Z_{k+3}$ (FIG. 14F). In the terminating step 1084, the exposure of voxels in the first, second, and third exposure data subsets 172, 174, and 176 occurs at the same build platform 44, 74 position along the build axis and may occur simultaneously or sequentially. In one preferred implementation, third exposure data set 176 is used for voxels that define the outer periphery of the object being built (also known as a "voxel frame") which can help preserve the integrity of the object during the build process and to ensure a smooth, more finished object appearance.

Figure 10A:
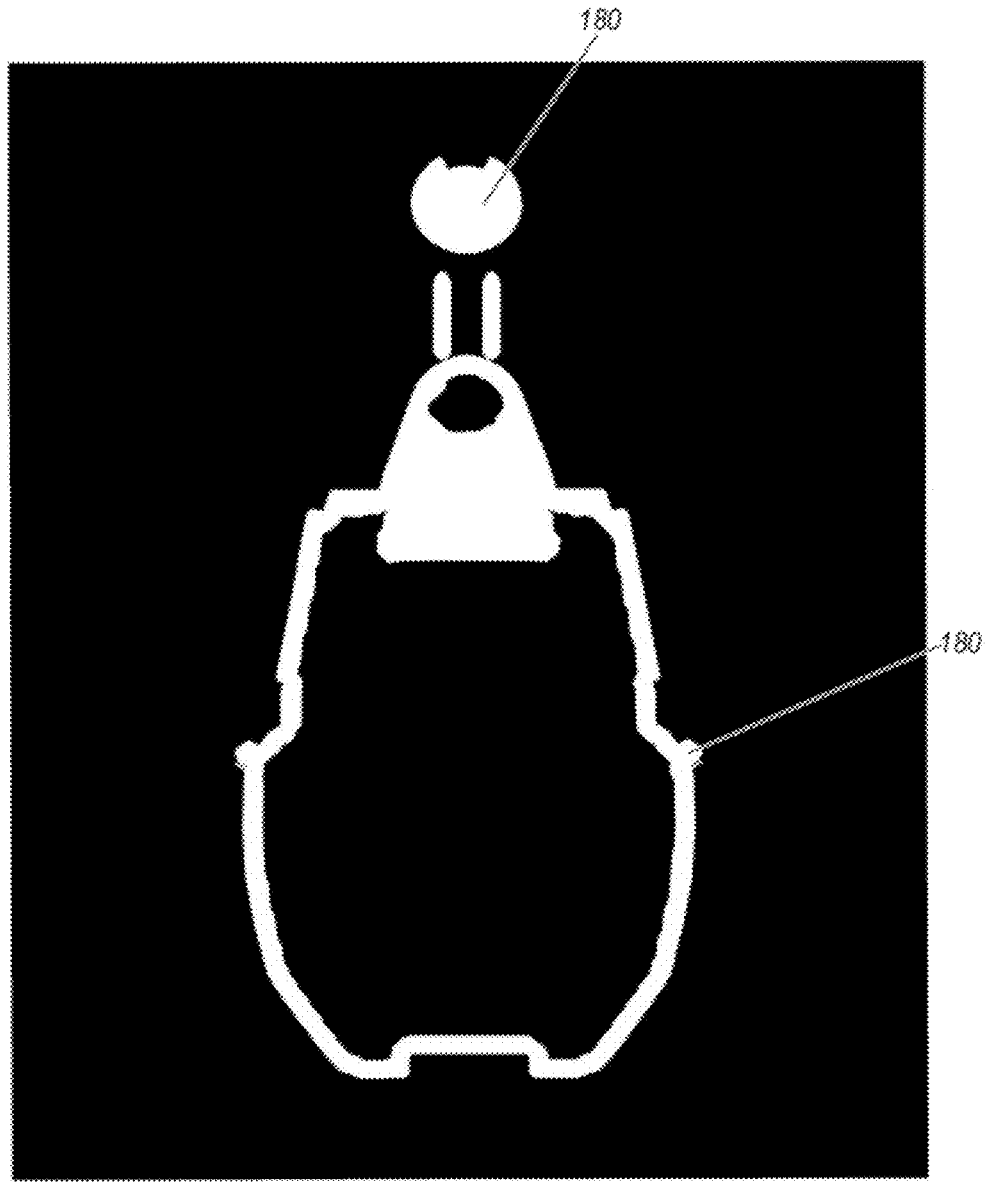
FIG. 10A is a bitmap depicting a first set of object data.
Figure 10B:
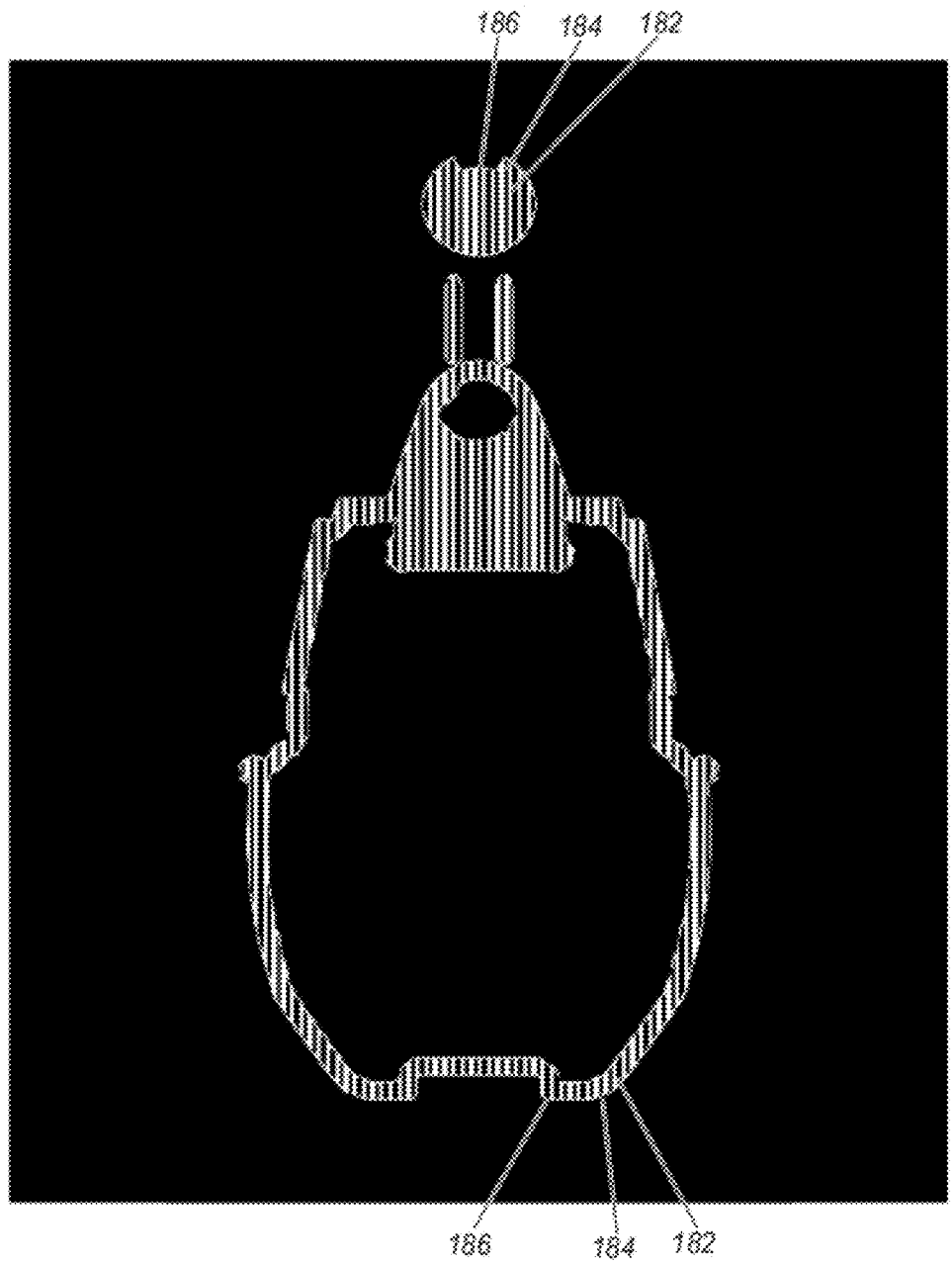
FIG. 10B is a first bitmap for exposing a first set of exposure data for the bitmap of FIG. 10A.
Figure 10C:
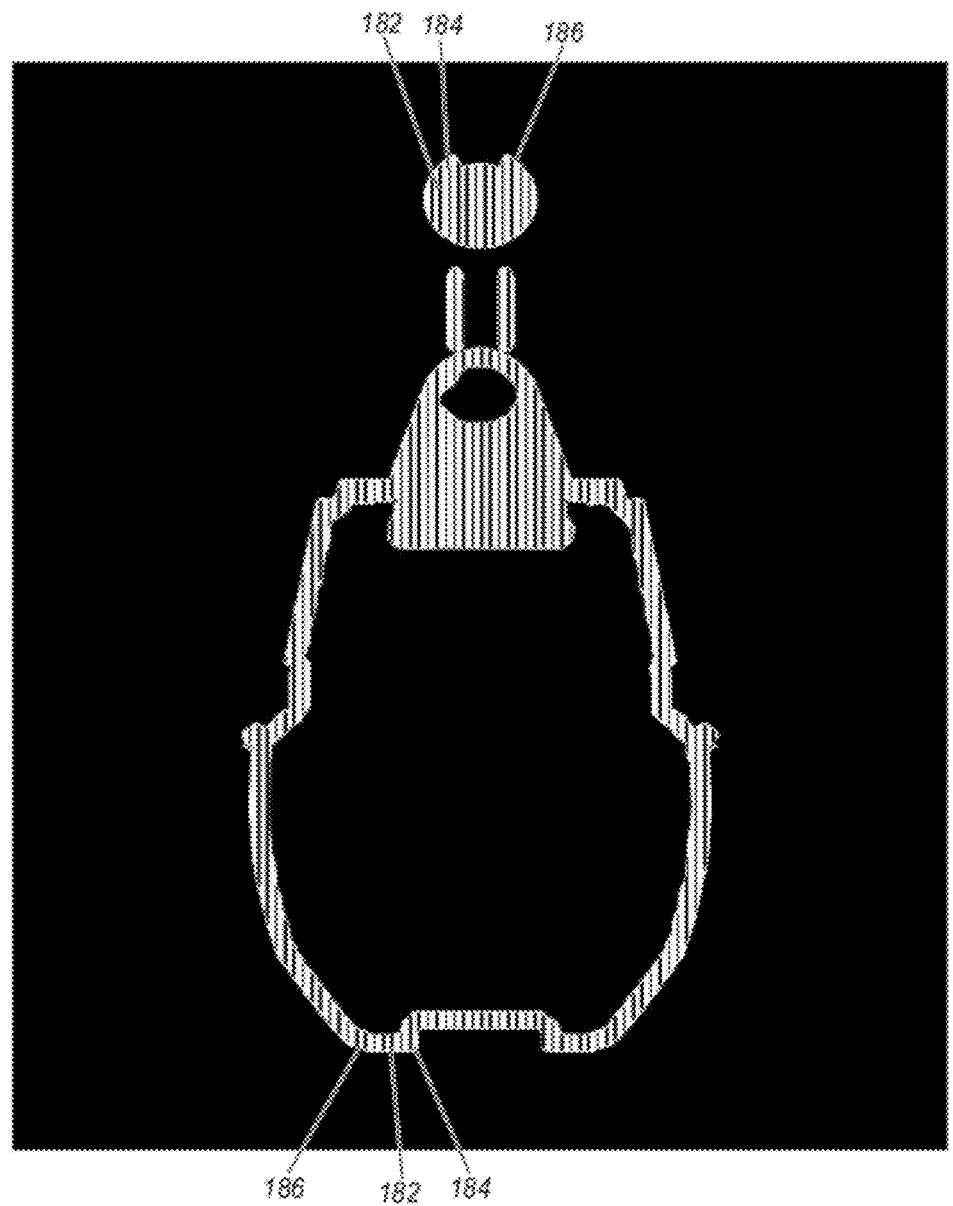
FIG. 10C is a second bitmap for exposing a second set of exposure data for the bitmap of FIG. 10A.

Referring to FIGS. 10A-10C, examples of an object data set bitmap (FIG. 10A), a first bitmap for exposing a first exposure data subset thereof (FIG. 10B), and a second bitmap for exposing a second exposure data subset thereof (FIG. 10C) are provided. In this case, the object is a toy gun. In FIG. 10A, the first set of object data 180 is shown in white.

The first set of object data 180 is subdivided into three exposure data subsets, 182, 184, and 186. In FIG. 10B, a the first exposure data subset 182 is a series of white stripes that represent areas where the object will be solidified by exposure to solidification energy from a pattern generator (e.g., pattern generator 50) while the build platform 44, 74 is at a first build axis position ($Z_1$). The black stripes represent the second exposure data subset 184 and will receive insufficient energy to cause solidification while the build platform is at the first build axis position.

When the build platform reaches a second position, $Z_2$, which is adjacent the first build axis position $Z_1$, the pattern generator 50 will again supply solidification energy to the solidifiable material. However, the solidification energy will be supplied to the second exposure data subset 184, which is indicated by the white stripes in FIG. 10C.

Third exposure data subset 186 defines the outer perimeter (voxel frame) of the object and is exposed in both the first exposure (FIG. 10B) and the second exposure (FIG. 10C) at a solidification energy intensity $I_f$ that is sufficient to produce the full solidification depth ($\Delta Z$) represented by the first set of object data 180 (FIG. 10A). However, because second exposure data subset 184 is not solidified in the first exposure, it will be solidified at an intensity of $2*I_f$. If the bitmap of FIG. 10B is used as an initiating bitmap for beginning the method of alternating the exposures of exposure data subsets, the solidification energy intensity applied to first exposure data subset 182 will be $I_f$. Otherwise, the intensity will be $2*I_f$. A terminating bitmap may also be provided to terminate the alternating exposure process in the manner described previously.

The methods described herein for reducing the force required to separate a solidified material from a solidification substrate are particularly beneficial in so-called "film transfer imaging" techniques, or "FTI." In a typical FTI system, a movable film or belt transports the solidifiable material from a source of the material (e.g., a reservoir or container) to a location in the field of projection of the pattern generator. Once in the field of projection, solidification energy is supplied to the solidifiable material in accordance with image data describing the object being built. Thus, the solidifiable material solidifies in contact with the film and may adhere to it. The object is generally then separated from the film (e.g., by the movement of a build platform on which the object is suspended or supported), and fresh solidifiable material is circulated back to the field of projection of the pattern generator. Thus, the film transports the solidifiable material and acts as a solidification substrate. However, unlike solidification substrate 79 discussed above, such films tend to be flexible and are susceptible to breakage when the object is separated from them. Thus, the methods described herein can be particularly advantageous in reducing the separation forces that are required. Examples of such FTI systems include the V-Flash™ apparatus supplied by 3D Systems of Rock Hill, S.C. and those described in Applicant's co-pending U.S. patent application Ser. No. 12/273,428, the entirety of which is hereby incorporated by reference. Additional examples of FTI systems include those shown and described in U.S. Patent Application Publication Nos. 2008/0169589 and 2008/0169586, the entire contents of which are hereby incorporated by reference.

Figure 15:
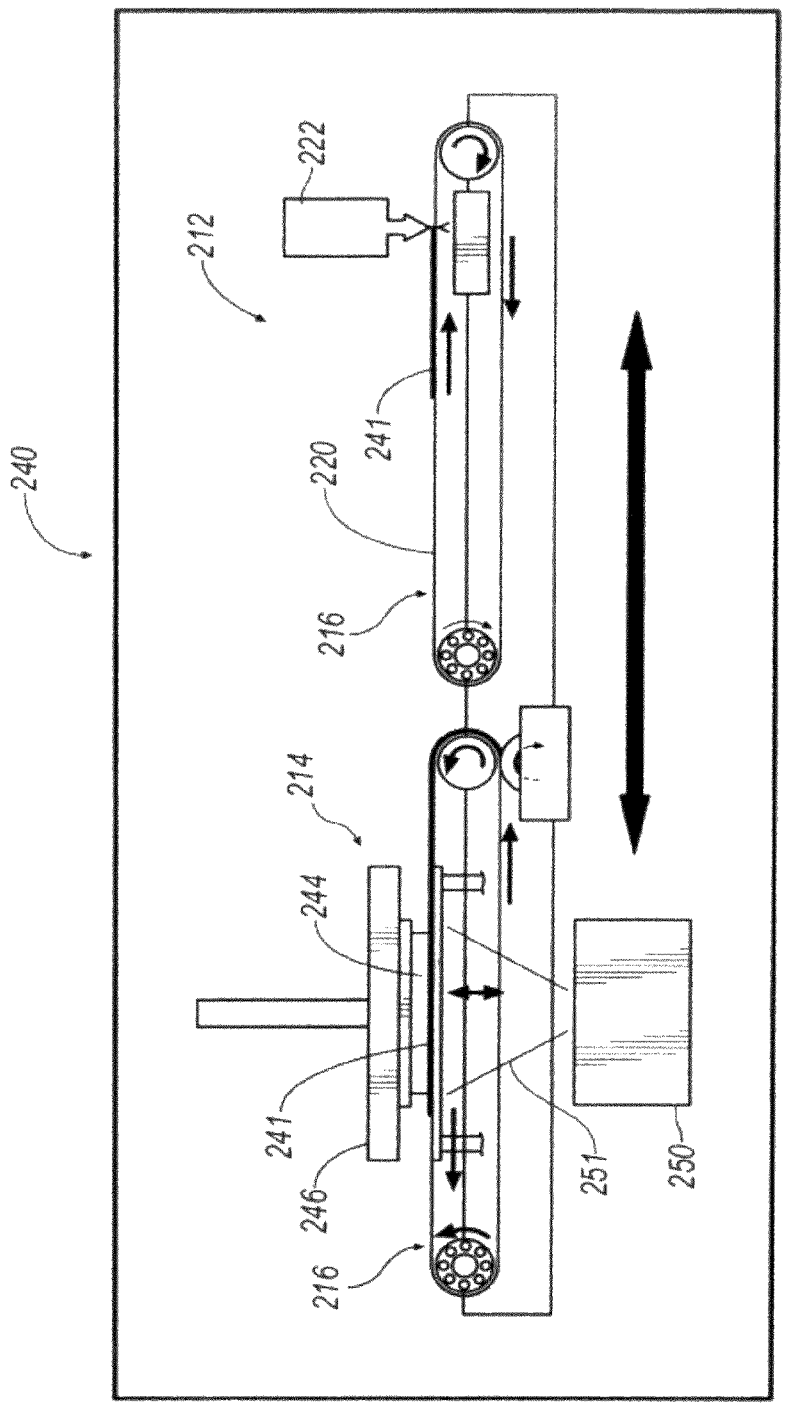
FIG. 15 is a first embodiment of a system for manufacturing a three-dimensional object from a solidifiable material using film transfer imaging.

Referring to FIG. 15, one exemplary FTI system 240 for manufacturing a three-dimensional object from a solidifiable material 241 is depicted. The system 240 includes a solidification section 214 and a deposition section 212. Shuttling mechanism 216 transfers solidifiable material 241 from solidification section 214 to deposition section 212.

Solidifiable material 241 may be a liquid, powder, paste, or other form, and in the system 240 of FIG. 15 is preferably a photopolymer. In deposition section 212, the photopolymer is deposited film 220 and its thickness is normalized. Shuttling mechanism 216 then transports film 220 with the solidifiable material 241 deposited thereon to solidification section 214. Film 220 then travels to the field of projection of pattern generator 250 and build platform 246 where solidification energy is supplied to the solidifiable material 241. The solidified material adheres to build platform 246 (or a previously solidified section of object 244 suspended thereon) and is pulled away from film 220 by the movement of build platform 246 away from film 220 in a vertically upward direction. Shuttling mechanism 216 then returns to the deposition section 212, and the process is repeated.

Film 220 (which may also be a belt) is preferably translucent and/or transparent to allow energy from pattern generator 250 to pass therethrough without a significant diminution in energy intensity or alteration of the transmitted wavelengths (in the case of UV or visible light). Film 220 is generally thin and flexible. As a result, the movement of build platform 246 in a direction away from film 220 can cause film 220 to deform and/or break due to the adhesion of the solidified object 244 in contact with it. Thus, the methods described herein are beneficial in reducing the adhesion of solidified sections of object 244 to film 220 and reducing the likelihood of such deformation or breakage.

Figure 16:
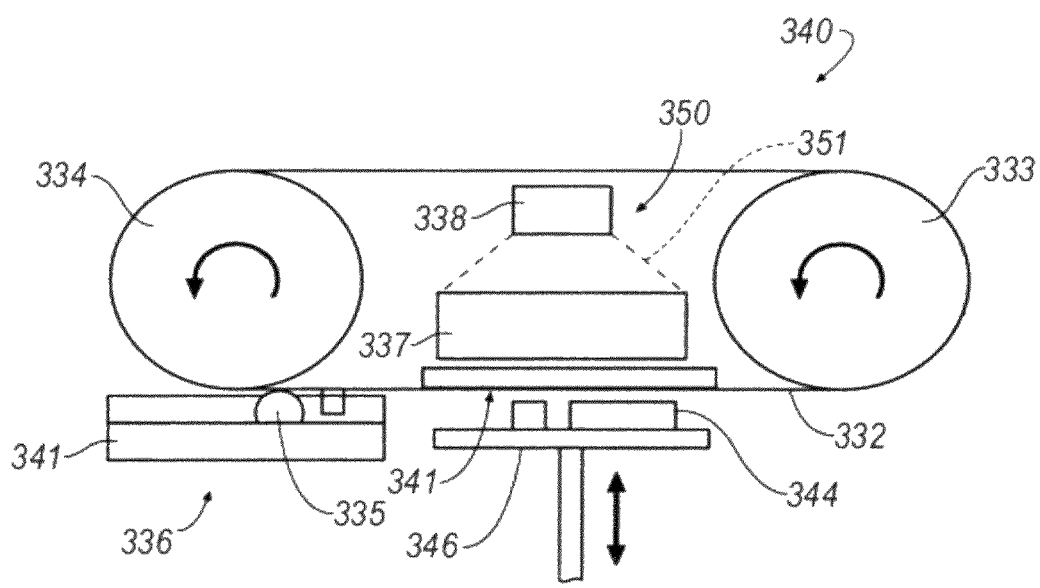
FIG. 16 is a second embodiment of a system for manufacturing a three-dimensional object from a solidifiable material using film transfer imaging.

Referring to FIG. 16, another exemplary FTI system 340 is depicted. FTI system 340 includes a movable film 332 to provide solidifiable material 341. Rollers 333 may rotate to move film 332 from under pattern generator 350. Here, pattern generator 350 includes an energy source (e.g., a light source) 338 and an SLM 337 (Spatial light modulator) to determine the pattern 351. Alternatively, SLM 337 may be configured as a selective collimator. In general, the solidification energy travels from pattern generator 350 to and through film 332 to reach reactive material 341. Film 332 may be configured as a transparent or translucent material, and as discussed herein, the transparency or translucency is not limited to visible light, but rather typically the energy produced by the pattern generator 350.

A roller 335 picks up solidifiable material 341 from within a cartridge 336 and applies it to film 332. The thickness of solidifiable material 341 on film 332 may be nearly the same thickness as thickness that is to be solidified or the thickness of solidifiable material 341 may be thicker than the thickness to be solidified. One of ordinary skill in the art will appreciate that the thickness of solidifiable material 341 when applied to film 332 may be a constant predetermined thickness, or it may be variable depending on a number of factors including the thickness of the object section to be generated.

As with the FTI system 240 of FIG. 15, during an object build process, solidifiable material 341 contacts film 332 and build platform 346 (or the most recently solidified section of object 344 which is supported thereon). The exposure of the solidifiable material 341 to solidification energy may cause the object to adhere to the film 332. As a result, as build platform 346 moves away from film 332 in the direction of the build axis, the adhered object may pull on film 332, causing it to distort or break. The methods described herein can advantageously reduce the likelihood of such distortion or breakage by reducing the surface area of adhesion between the object 344 and the film 332.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A method of forming a three-dimensional object from an object representation having a build axis dimension, the method comprising:
providing a solidification substrate;
supplying a first volume of the solidification material adjacent the solidification substrate to create a first exposed surface of the solidifiable material;
providing a set of object data corresponding to a plurality of locations in the object, each location corresponding to a position along a build axis dimension and a position relative to the build axis dimension;
subdividing the set of object data into a first exposure data subset and a second exposure data subset, wherein the first exposure data subset defines a first subset of positions relative to the build axis, and the second exposure data subset defines a second subset of positions relative to the build axis;
solidifying only the first subset of positions on the first exposed surface of solidification material without solidifying the second subset of positions;
providing a second exposed surface of the solidifiable material;
solidifying the second subset of positions on the second exposed surface of solidifiable material to a first depth without solidifying the first subset of positions on the second exposed surface of solidifiable material;
providing a third exposure surface of the solidifiable material;
solidifying the first subset of positions on the third exposure surface without solidifying the second subset of positions on the third exposure surface; and solidifying the first subset of positions to a second depth without solidifying the second subset of positions.

2. The method of claim 1, wherein the set of object data comprises a plurality of voxels.

3. The method of claim 1, wherein the set of object data comprises bitmap data.

4. The method of claim 1, further comprising providing a digital light projector, wherein the step of solidifying only the first subset of positions on the first exposed surface of the solidification material comprises projecting light from the digital light projector onto the first subset of positions on the first exposed surface of the solidification material.

5. The method of claim 1, further comprising:
providing a solidification substrate; and
supplying a first volume of the solidifiable material adjacent the solidification substrate to create the first exposed surface of the solidifiable material.

6. The method of claim 5, wherein the solidification substrate comprises a film.

7. The method of claim 5, further comprising providing a solidifiable material container containing the solidifiable material and a build platform disposed within the container, wherein the step of supplying a first volume of the solidifiable material adjacent the solidification substrate comprises moving the build platform away from the solidification substrate.

8. The method of claim 7, further comprising providing a build platform for supporting or suspending the object as the object is built, wherein during an object build operation, one selected from the solidification substrate and the build platform continuously moves away from the other of the solidification substrate and the build platform.

9. The method of claim 1, wherein the set of object data includes a maximum incremental object thickness along the build axis dimension.

10. The method of claim 9, wherein the step of solidifying only the first subset of positions on the first exposed surface of solidification material comprises solidifying the first subset of positions on the first exposed surface to the second depth that is substantially equal to the maximum incremental object thickness.

11. A method of forming a three-dimensional object from an object representation having a build axis dimension, the method comprising:
providing a solidification substrate;
supplying a first volume of the solidification material adjacent the solidification substrate to create a first exposed surface of the solidifiable material;
providing a set of object data corresponding to a plurality of locations in the object, each location corresponding to a position along a build axis dimension and a position relative to the build axis dimension, and wherein the set of object data includes a maximum incremental object thickness along the build axis dimension;
subdividing the set of object data into a first exposure data subset and a second exposure data subset, wherein the first exposure data subset defines a first subset of positions relative to the build axis, and the second exposure data subset defines a second subset of positions relative to the build axis;

solidifying only the first subset of positions on the first exposed surface of solidification material without solidifying the second subset of positions;

providing a second exposed surface of the solidifiable material;

solidifying the second subset of positions on the second exposed surface of solidifiable material to a first depth without solidifying the first subset of locations on the second exposed surface of solidifiable material; and solidifying the first subset of positions to a second depth without solidifying the second subset of positions;

wherein the step of solidifying only the first subset of positions on the first exposed surface of solidification material comprises solidifying the first subset of positions on the first exposed surface to the second depth that is greater than the maximum incremental object thickness along the build axis dimension.

12. The method of claim 11, wherein the depth greater than the maximum incremental object thickness is twice the maximum incremental object thickness.

13. A method of forming a three-dimensional object from an object representation having a build axis dimension, the method comprising:

providing a solidification substrate;

supplying a first volume of the solidification material adjacent the solidification substrate to create a first exposed surface of the solidifiable material;

providing a set of object data corresponding to a plurality of locations in the object, each location corresponding to a position along a build axis dimension and a position relative to the build axis dimension;

subdividing the set of object data into a first exposure data subset and a second exposure data subset, wherein the first exposure data subset defines a first subset of positions relative to the build axis, and the second exposure data subset defines a second subset of positions relative to the build axis;

solidifying only the first subset of positions on the first exposed surface of solidification material without solidifying the second subset of positions;

providing a second exposed surface of the solidifiable material;

solidifying the second subset of positions on the second exposed surface of solidifiable material to a first depth without solidifying the first subset of locations on the second exposed surface of solidifiable material; and solidifying the first subset of positions to a second depth without solidifying the second subset of positions;

wherein the first subset of positions relative to the build axis and the second subset of positions relative to the build axis define an alternating sequence of first subset members and second subset members.

14. The method of claim 13, wherein the alternating sequence comprises a first alternating sequence in a first direction and a second alternating sequence in a second direction.

15. The method of claim 13, wherein the alternating sequence comprises rows of first exposure data subset members adjacent to rows of second exposure data subset members.

16. A method of forming a three-dimensional object from an object representation having a build axis dimension, the method comprising:

providing a solidification substrate;

supplying a first volume of the solidification material adjacent the solidification substrate to create a first exposed surface of the solidifiable material;

providing a set of object data corresponding to a plurality of locations in the object, each location corresponding to a position along a build axis dimension and a position relative to the build axis dimension;

subdividing the set of object data into a first exposure data subset and a second exposure data subset, wherein the first exposure data subset defines a first subset of positions relative to the build axis, and the second exposure data subset defines a second subset of positions relative to the build axis;

solidifying only the first subset of positions on the first exposed surface of solidification material without solidifying the second subset of positions;

providing a second exposed surface of the solidifiable material;

solidifying the second subset of positions on the second exposed surface of solidifiable material to a first depth without solidifying the first subset of locations on the second exposed surface of solidifiable material; and solidifying the first subset of positions to a second depth without solidifying the second subset of positions;

wherein the step of solidifying only the first subset of positions on the first exposed surface of solidification material comprises partially solidifying the first exposed surface in contact with the solidification substrate, and the method further comprises separating the partially solidified first exposed surface from the solidification substrate.

17. The method of claim 16, further comprising supplying the solidification material between the partially solidified, separated first exposed surface of the solidification material and the solidification substrate.

18. The method of claim 1, wherein the first depth is substantially twice the second depth.

19. The method of claim 1, wherein the solidification material comprises a photopolymer.

20. The method of claim 1, wherein the solidification substrate comprises a translucent glass layer.

21. The method of claim 1, wherein the solidification substrate comprises a translucent, resilient layer.

22. The method of claim 20, wherein the solidification material comprises a protective film.

23. An apparatus for producing a three-dimensional object from a solidifiable material, comprising:

a pattern generator having an energy projection region;

a build platform moveable along the direction of a build axis and positioned in the energy projection region; and a solidification substrate disposed between the pattern generator and the build platform; and at least one computer having a processor and a computer-readable memory with instructions programmed thereon for performing the following steps:

subdividing a set of object data into a first exposure data subset and a second exposure data subset, wherein the first exposure data subset defines a first subset of positions relative to the build axis, and the second exposure data subset defines a second subset of positions relative to the build axis;

determining a first solidification depth from a first exposed surface of the solidifiable material for the first exposure data subset; and directing the supply of solidification energy from the pattern generator to solidify the first subset of positions on the first exposed surface to the first solidification depth without solidifying the second subset of positions determining a second solidification depth from a second exposed surface of the solidifiable material for the second exposure data subset; and directing the supply of solidification energy from the pattern generator to solidify the second subset of positions on the second exposed surface to the second solidification depth without solidifying the first subset of positions, wherein the at least one computer is further programmed to receive a maximum incremental object thickness of an object representation, and the solidification depth is greater than the maximum incremental object thickness.

24. The apparatus of claim 23, wherein the at least one computer comprises a control computer configured to communicate the first exposure data subset to the pattern generator.

25. The apparatus of claim 23, further comprising a translucent solidification substrate disposed between the pattern generator and the build platform.

26. The apparatus of claim 23, wherein the pattern generator is a digital light projector.

27. The apparatus of claim 23, further comprising a moving film and a source of the solidifiable material, wherein when the film advances, a volume of the solidifiable material is applied to the film and enters the energy projection region of the pattern generator.

28. The apparatus of claim 23, further comprising a solidifiable material container, wherein the solidifiable material is disposed in the solidifiable material container.

29. The apparatus of claim 28, wherein the build platform is disposed in the solidifiable material container.

30. The apparatus of claim 23, wherein the exposure data is voxel data.

* * * * *